US009626246B1

(12) United States Patent
Parkhurst

(10) Patent No.: US 9,626,246 B1
(45) Date of Patent: Apr. 18, 2017

(54) SYSTEM AND METHOD FOR I/O OPTIMIZED DATA MIGRATION BETWEEN HIGH PERFORMANCE COMPUTING ENTITIES AND A DATA STORAGE SUPPORTED BY A DE-CLUSTERED RAID (DCR)ARCHITECTURE WITH VERTICAL EXECUTION OF I/O COMMANDS

(71) Applicant: DATADIRECT NETWORKS, INC., Chatsworth, CA (US)

(72) Inventor: Micheal S. Parkhurst, Newbury Park, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 92 days.

(21) Appl. No.: 14/849,975

(22) Filed: Sep. 10, 2015

(51) Int. Cl.
H03M 13/00 (2006.01)
G06F 11/10 (2006.01)
H04L 29/08 (2006.01)
G06F 3/06 (2006.01)

(52) U.S. Cl.
CPC .......... *G06F 11/1076* (2013.01); *G06F 3/064* (2013.01); *G06F 3/0619* (2013.01); *G06F 3/0689* (2013.01); *H04L 67/1095* (2013.01)

(58) Field of Classification Search
CPC .. G06F 11/1076; G06F 11/10; G06F 11/1092; G06F 2211/1028; G06F 2211/1009
See application file for complete search history.

(56) References Cited

U.S. PATENT DOCUMENTS

2014/0195847 A1* 7/2014 Webman ............. G06F 11/2094
714/6.22
2014/0250269 A1* 9/2014 Shanbhag ............. G06F 3/0689
711/114

OTHER PUBLICATIONS

Son Hoang Dau et al., Parity de-clustering for fault tolerant storage systems via t-designs, Mar. 2013.*
Schwarz, Permutation Development data layout (PDDL), IEEE, Jan. 1999, p. 1-4.*
E.K. Lee, et al., "Petal: Distributed Virtual Disks," Proceedings of the Seventh International Conference on Architectural Support for Programming Languages and Operating Systems, 1996.
Mark Holland, et al., "Parity De-clustering for Continuous Operation in Redundant Disk Arrays," Proceedings of the Fifth Conference on Architectural Support for Programming Languages and Operating Systems, 1992.

* cited by examiner

*Primary Examiner* — Shelly A Chase
(74) *Attorney, Agent, or Firm* — Rosenberg, Klein & Lee

(57) ABSTRACT

A data storage system employs a de-clustered RAID (DCR) organization with a Vertical Rotation approach to prevent overflow of cache buffers. The Vertical Rotation Controller limits the size of the I/O operation relative to a respective Physical Disk Extent (PDE) to the cache buffer, and writes/reads a computed parity stripe matching the size of the cache, to form chunk bundles in the PDEs. When a bundle is filled in a first PDE residing at a first row, a PDE residing at a second row vertically displaced from the first row is engaged for forming another bundle. The process continues until all PDEs in a Vertical Rotation Group (VRG) are filled, or continues to a next VRG vertically displaced from a previous one to end I/O requesting.

20 Claims, 12 Drawing Sheets

| ROW | D1 | D2 | D3 | D4 | D5 | D6 | D7 | D8 | P | Q |
|---|---|---|---|---|---|---|---|---|---|---|
| 0 | 45:0 | 137:0 | 244:1 | 312:0 | 376:0 | 439:0 | 549:0 | 722:0 | 800:0 | 815:1 |
| 1 | 22:0 | 128:0 | 171:0 | 285:0 | 346:0 | 476:0 | 558:0 | 613:1 | 766:1 | 783:0 |
| 2 | 59:0 | 165:0 | 171:1 | 292:0 | 411:0 | 443:0 | 588:1 | 591:0 | 786:0 | 781:0 |
| 3 | 26:0 | 88:0 | 244:1 | 293:0 | 394:0 | 465:0 | 573:0 | 643:3 | 811:0 | 244:2 |
| 4 | 82:0 | 107:0 | 227:0 | 254:0 | 443:1 | 345:0 | 581:1 | 626:0 | 769:0 | 782:0 |
| 5 | 39:0 | 124:0 | 171:3 | 295:0 | 397:0 | 487:0 | 515:0 | 661:1 | 836:0 | 798:0 |
| 6 | 77:0 | 157:0 | 225:0 | 263:0 | 372:0 | 496:0 | 583:0 | 621:0 | 762:0 | 487:1 |

FIG. 5B

SYSTEM AND METHOD FOR I/O OPTIMIZED DATA MIGRATION BETWEEN HIGH PERFORMANCE COMPUTING ENTITIES AND A DATA STORAGE SUPPORTED BY A DE-CLUSTERED RAID (DCR)ARCHITECTURE WITH VERTICAL EXECUTION OF I/O COMMANDS

FIELD OF THE INVENTION

The present invention is directed to data migration between high performance computing cluster architectures (data generating entities) and data storage media. Particularly, the present invention relates to a data migration technique rendering optimized I/O activity by using a concept of a Vertical Rotation in de-clustered RAID (DCR) architectures.

In its overall concept, the present invention relates to a de-clustered RAID (DCR) data storage organization forming a 2-dimensional DCR pool, which is a collection of Physical Disk Extents (PDEs) arranged in rows and columns, where each parity stripe is striped at respective PDEs constituting a row. This de-clustered RAID organization permits to leverage a vast number of drives for I/O operations and prevents the on-board cache buffer from overflow. For each PDE of interest, a Vertical DCR rotation is performed by reading from (or writing to) only a predetermined portion (not exceeding a size of an on-board cache buffer) of the PDE of interest in one row before switching "vertically" to a PDE in a next row, thus maintaining full vertical connection speed for a column of interest, thereby overcoming the RAIDset speed limitations which are typical to the subsequent, i.e., "horizontal", I/O commands execution throughout all of the PDEs in the same DCR row prior to switching to another row.

In addition, the present invention is directed to a data migration and storage system which performs RAID calculations on the random ingress data received from the data generating architectures prior to storing the data, and providing data reliability and preserving data integrity through data reconstruction of corrupted data and data integrity checking, where a parity stripe unit (containing a predetermined number of data units and at least one parity unit computed for the data stripe unit) is distributed in redundant disk arrays in accordance with parity de-clustering principles, by which an improved I/O activity is attained through performance of a vertical execution of I/O commands.

BACKGROUND OF THE INVENTION

Computer clusters, or groups of linked computers, have been widely used to improve performance over that provided by a single computer, especially in extended computations, for example, involving simulations of complex physical phenomena, etc. Conventionally, in a computer cluster, computer nodes (also referred to herein as client nodes, or data generating entities) are linked by a high speed network which permits the sharing of computer resources and memory. Data transfers to or from the computer nodes are performed through the high speed network and are managed by additional computer devices, also referred to as file servers. The file servers file data from multiple computer nodes and assign a unique location for each computer node in the overall file system.

Typically, the data migrates from the file servers to be stored on rotating media such as, for example, common disk drives arranged in storage disk arrays, or solid-state storage devices for storage and retrieval of large amounts of data. Arrays of solid-state storage devices (such as flash memory, phase change memory, memristors, and other non-volatile storage units) are also broadly used in data storage systems.

The most common type of a storage device array is the RAID (Redundant Array of Inexpensive (Independent) Drives). The main concept of the RAID is the ability to virtualize multiple drives (or other storage devices) into a single drive representation. A number of RAID schemes have evolved, each designed on the principles of aggregated storage space and data redundancy.

Most of the RAID schemes employ an error protection scheme called "parity" which is a widely used method in information technology to provide for tolerance in a given set of data.

For example, in the RAID-5 data structure, data is striped across a number of hard drives, with a dedicated parity block for each stripe. The parity blocks are computed by running the XOR comparison of each block of data in the stripe. The parity is responsible for the data fault tolerance. In operation, if one disk fails, a new drive can be put in its place, and the RAID controller can rebuild the data automatically using the parity data.

Alternatively to the RAID-5 data structure, the RAID-6 scheme uses the block-level striping with double distributed parity P1+P2, and thus provides fault tolerance from two drive failures. They can continue to operate with up to two failed drives. This makes larger RAID groups more practical, especially for high availability systems.

Disk drives are mechanical devices which are built with rotating media that requires a read-and-write head to be moved along the rotating media's surface in order to store or retrieve data. Nowadays disk drives with the data storage of up to 10 TB (Terabyte) are capable of rotating with the speed of up to 15 K RPM (Revolutions per Minute). In addition to spinning, the drive must also move the read/write head back and forth between the tracks. Unfortunately, even with the rotation speed of 15 K RPM and the seek time of the head of about 8 ms, most of contemporary disk drives can only maintain a sustained transfer rate of about 143 MBs (Megabits per second).

In order to eliminate complex timing algorithms from the computer server, the disk drives are provided with an on-board cache which acts as an elastic buffer. This buffer permits a timing disconnect between the commands "read" or "write" so that the server can issue several commands in a rapid order without having to wait for the read-and-write head to arrive at the correct destination on the rotating media, i.e., while the read-and-write head is still in the "seek" mode.

One of the primary advantages of RAID is that data is striped across multiple drives. Since each drive has the on-board cache, the server can sequentially issue commands across multiple drives in rapid succession, and rotation (or execution) of commands across multiple drives is carried out in the striping process. Thus, by the time the server finished issuing commands to the last drive in the sequence, the first drive advantageously may be ready to accept another command. In this manner, the server is able to continually issue commands to the drives without having to wait for a command to be completed. This speed advantage exists as long as the connection speed to the drive is faster than the maximum transfer rate of the disk drive.

In a traditional RAID scheme, shown in FIG. 1, a pool 10 includes a number of drives 12, which accommodate parity stripes $a_1, a_2, \ldots, a_n$ each of which includes data chunks 14 and parity data, for example, 16 and 18.

The on-drive cache sizes vary, with 64 MB being a typical size. With a SAS (Serial Attached SCSI) connection speed of moving data to the drives of about 600 MBs, it would take approximately 133 ms to fill the on-board cache on a disk drive. Thus the server can overflow the cache on a single drive rather quickly.

By writing sequentially (horizontally) to each drive 12 in the RAIDset (pool) 10, the server can extend the amount of time it takes to fill all of the caches by an order of 2, 5, or 10×. Even with 10 drives, it only takes about 1.3 seconds to reach the overflow condition in the RAID pool.

During I/O activities, the on-board caches are also drained on the drive side, thus moderating the overflow. When reading or writing in a sequential ("horizontal") fashion, a typical hard drive can sustain a transfer rate of 80 to 150 MBs. Thus it is the ratio of the input speed to the output speeds that determines the overflow. With an input speed of 600 MBs and an outflow speed of 150 MBs, a set of 4 drives is sufficient to saturate the SAS connection. If the maximum transfer rate drops, for example, to 120 MBs, then 5 drives will be needed to maintain saturation.

With an RAID-5 (4 data and 1 parity) redundancy scheme, a single SAS channel is saturated at 600 MBs. An RAID-6 (8 data and 2 parity) redundancy scheme will require 2 separate SAS channels in order to maintain saturation. A solution to increasing the bandwidth to a RAIDset is to have each drive on its own SAS (Serial Attached SCSI) Channel. However, once again this raises the issue of overflowing the drive caches for a single drive after approximately 133 ms of the I/O operation.

It has been observed that the write/read speed temporarily bursts at a high data rate until the overflow occurs, and then it slows down to the maximum transfer rate multiplied by the number of drives in the RAIDset. An RAID-6 (8 data and 2 parity) redundancy scheme would top out at a transfer rate of about 10×120 MBs=1.2 GBs.

Currently the only way to leverage multiple drives other than the current stripe shown in FIG. 1 in a RAIDset is to define multiple Virtual Disks (VD) as is done in de-clustered RAIDs organizations, where virtual disks are dynamically created out of large pool of available drives with the intent that a RAID rebuild will involve a large number of drives working together, and thus reduce the window of vulnerability for data loss. An added benefit is that random READ/WRITE I/O (input/output) performance is also improved.

The principles of parity de-clustering are known to those skilled in the art. For example, they are presented in E. K. Lee, et al., "Petal: Distributed Virtual Disks", published in the Proceedings of the Seventh International Conference on Architectural Support for Programming Languages and Operating Systems, 1996; and Mark Holland, et al., "Parity De-clustering for Continuous Operation in Redundant Disk Arrays", published in Proceedings of the Fifth Conference on Architectural Support for Programming Languages and Operating Systems, 1992. As presented in Edward K. Lee, et al., clients use the de-clustered redundant disk arrays as abstract virtual disks, each providing a predetermined amount of storage space built with data storage units (blocks) of Physical Disks (PD) included in the virtual disk.

The multiple VDs can be defined within the same storage system or multiple storage systems. The down side to multiple VDs is that some additional piece of software is needed for striping and merging the multiple VDs into a single presentation for a server access. For example, in Linux this is normally accomplished with LVM cache, and in MS Windows a Disk Manager is used for the same purpose. As minor an effort as it might be to merge the VDs, it still increases the CPU load for the servers and adds complexity to their management, especially in a server de-clustered environment.

One of the advantages of parallel file systems, such as the GPFS and Lustre, is that they stripe their I/O across multiple storage systems which has the effect of increasing the number of Physical Drives in a VD which tends to maximize data transfer rates for sequential access. However, both GPFS and Lustre operate on an external server independent of the storage. Linux and MS Windows can stripe VDs together but they also run on external servers, which complicates the system structure and operation.

A more efficient approach for preventing the overflowing of the drives' on-board cache in the de-clustered RAID organization and accomplishing the striping without the need for multiple storage systems or additional software and/or external servers would greatly benefit the RAID technology.

SUMMARY OF THE INVENTION

It is therefore an object of the present invention to provide a data migration system and method supported by a de-clustered RAID (DCR) storage system where a Vertical Rotation DCR approach is implemented resulting in optimized I/O operations, to provide an increased sustained data transfer rate and prevent on-board cache buffer overflow.

The present invention constitutes a method for data migration in a data storage system supported by de-clustered RAID (DCR) architecture with vertical execution of I/O commands.

The subject method executes a routine of:

forming a de-clustered Redundant Array of Independent Disks (RAID) structure of a plurality of physical data storage devices, which includes a first number of rows and a second number of columns. Each of the physical data storage devices includes an on-board cache buffer and a respective number of Physical Disk Extends (PDEs), each constituting a data storage unit having a predetermined size and a physical address in relation to the physical data storage device it resides on. In the de-clustered RAID (DCR) structure (which may also be referred to as a Virtual Disk), a respective parity stripe is striped across a number of PDEs forming a respective row in the VD.

Upon receipt of an I/O request issued by at least one data generating entity, the procedure continues with a routine of establishing physical addresses of respective PDEs of interest identified in the I/O request by Logical Block Addresses (LBAs).

The method further proceeds through the RAID computation routine, by computing parity for the data ingress with the I/O request, and forming a parity stripe composed of the data units and the parity.

The parity stripe is subsequently striped using a Vertical Rotation Routine throughout a collection of respective PDEs included in the 2-dimensional DCR system.

The Vertical Rotation routine is carried out through the steps of:

computing, in the collection of PDEs, at least one vertical rotation group, limiting I/O operation relative to each PDE in the Vertical Rotation Group to a size of the on-board cache buffer, writing (or reading) a portion of the parity stripe (not exceeding the size of the on-board cache) into a PDE included in the vertical rotation group in question. This forms a first data chunk bundle (which does not exceed the size of the on-board cache buffer), switches to another PDE located at a next row, and fills a second data chunk bundle (which does not exceed the size of the on-board cache buffer) in another PDE residing at the next row.

The vertical rotation routine further continues through switching the writing/reading chunk bundles "vertically" in the vertical rotation group, until all PDEs in the vertical rotation group are filled with chunk bundles of the size matching (or not exceeding) the size of the on-board cache buffer. During the vertical rotation routine, the writing/reading of the chunk bundles may return to the first row.

When the Vertical Rotation Group is filled, and there are still chunks of data and/or parity to be written/read, the method continues with vertical rotation at I/O commands in another vertical rotation group which is disposed along a respective column of the de-clustered Virtual Disc in vertical spaced apart relationship to the previous Vertical Rotation group.

In order to perform the Vertical Rotation Routine, at least one Vertical Rotation Controller Sub-System is operatively coupled to the de-clustered RAID (DCR) structure as well as to the data generating entity.

The Vertical Rotation Controller Sub-System is configured with a Drive Index Look-Up-Table (LUT). Upon receiving the I/O request, the Vertical Rotation Controller initializes the Drive Index LUT, and establishes a physical address of the PDE of interest using the Drive Index LUT and based on the LBAs identified in the I/O request.

The subject method further continues through:

forming the Drive Index LUT with a number of variables, including a number of Physical Disks (PDs) per a row in the DCR structure, a size of the Vertical Rotation group corresponding to a number of the data chunk bundles to be written therein, predetermined size of the data units and parity units, a number of LBAs per each parity stripe defined as the size of the data parity units times the number of PDs per row, a number of LBAs per the row defined as the size of the PDE divided by the number of data parity units in the row, and a number of LBAs per Vertical Rotation Group defined as the number of LBAs per row times Vertical Rotation Group size.

In the subject method, subsequently to collecting the above-listed variable, the following computational procedures are performed:

computing the Vertical Rotation Group number as the LBA identified in the I/O request divided by the number of LBAs per Vertical Rotation Group;

computing a row number as the LBA identified in the I/O request—(Vertical Rotation Group Number times the number of LBAs per Vertical Rotation Group) divided by the number of LBAs per the row;

computing a stripe number as the LBA identified in the I/O request—(Vertical Rotation Group number times the number of LBAs per the Vertical Rotation group)—(Row number times the number of LBAs per row) divided by the number of LBAs per stripe;

computing a column number as Modulo of the LBA identified in the I/O request divided by the size of the data/parity units divided by the number of PDs per row;

computing a Drive Offset as the LBA identified in the I/O request—(Vertical Rotation Group number times the number of LBAs per Vertical Rotation Group)—(the Row number times the number of LBAs per row)—(stripe number times the number of LBAs per parity stripe)—(column number times the size of the data/parity unit).

Subsequent to the step of computing the Vertical Rotation Group Number, row number column number, and Drive OFFSET, a test is performed to determine whether all data units in the I/O request have been processed, and the Drive Index LUT is searched for the drive of interest corresponding to the row number, column number, and index of the Vertical Rotation Group number.

Subsequently, the subject method continues with the execution of the I/O request for the data/parity unit(s) still to be processed using the index of the drive of interest and the computed drive OFFSET. The routine then decreases a Block Left variable by one, and increases the drive OFFSET variable, thus formulating a new drive OFFSET, and increasing a "total bytes written" variable by one.

Subsequent to increasing the drive OFFSET variable by one, the method determines if the new drive OFFSET value has crossed a data/parity unit size threshold. If the data/parity unit size threshold has been crossed, the parity stripe number is advanced by 1, and the column number is set to zero, thus transferring to a new drive number and PDE in the Drive Index LUT.

Subsequent to advancing the parity stripe number by one, the method tests whether the advanced parity stripe number falls within the chunk bundle, and if the advanced parity stripe number exceeds the chunk bundle size, the advanced parity stripe number is reset to zero, and the row number is increased by one, thus switching the I/O execution vertically from one row to another.

Subsequent to switching vertically from one row to another, the subject method continues via testing if row number has exceeded the Vertical Rotation Group size, and if exceeded, resets the row number to zero, and advances the chunk bundle number by one.

Subsequent to increasing the chunk bundle number by one, the routine proceeds by the steps of:

testing if the increased number of the chunk bundle exceeds a number of the chunk bundles in the row, where the row is determined by a size of the PDE of interest and a number of data/parity units in the chunk bundle. If the increased chunk bundle exceeds the number of the bundles in the row, the Vertical Rotation Group number is advanced by 1, and the servicing of the I/O request is switched to another Vertical Rotation Group number.

The switching from one Vertical Rotation Group to another is performed until all the space in the PDE is filled.

During the routine execution, at least one Virtual Disk structure is formed from a collection of respective PDEs residing on at least a portion of the plurality of physical data storage devices, where each respective PDE is identified in the Virtual Disk structure by the LBA.

The data generating entity is operatively coupled to the Virtual Disk, and RAID computations are applied to the data units identified in the I/O request. Subsequently, the parity stripe is written in the Virtual Disk in de-clustered fashion on the collection of PDEs.

Another aspect of the present invention constitutes a data storage system with improved I/O operation and overflow prevention. The subject system includes at least one data generating entity operatively coupled to a plurality of arrayed physical data storage devices. Each of the physical data storage devices includes an on-board cache buffer of a first predetermined size, and a respective number of Physical Disk Extends (PDEs), each constituting a data storage unit having a predetermined size and a physical address in relation to the physical data storage device.

The data generating entity is configured to issue at least one respective I/O request for data migration between the data generating entity and respective data storage devices. The I/O request includes a number of data units and Logical Block Addresses (LBAs) for respective PDEs of interest.

The system uses a de-clustered Redundant Array of Independent Disks (RAID) structure formed with the plurality of physical data storage devices The de-clustered RAID structure includes a collection of PDEs arranged in a first number of rows and a second number of columns.

The subject system further includes a RAID unit configured for computing at least one parity unit associated with the number of data units, forming a parity stripe composed of the ingress data units and at least one parity unit, and for striping said parity stripe in the de-clustered RAID (DCR) structure across a collection of the respective PDEs of interest.

A Vertical Rotation Controller Sub-System is operatively coupled to the RAID unit, at least one data generating entity, and the DCR structure. The Vertical Rotation Controller Sub-System includes at least first and second Vertical Rotation Groups (VRGs). Each VRG contains a predetermined number of rows of storage units associated with a respective subset of the column of the PDEs in the DCR structure.

The Vertical Rotation Controller Sub-System is configured to write a parity stripe's portion (limited to the size of the on-board cache buffer) into a PDE in the first Vertical Rotation Group, thus forming a first data chunk bundle matching the size of the on-board cache buffer, and switch to a PDE residing at a second row in the first Vertical Rotation Group to fill a second data chunk bundle matching the size of the on-board cache buffer in the next PDE in the second row with another portion of the parity stripe.

The Vertical Rotation Controller Sub-System is further configured to fill each respective PDE arranged vertically in the DCR structure with the respective portions of said parity stripe, until the first VRG is filled with the data chunk bundles. Once the first VRG is filled with chunk bundles, the Vertical Rotation Controller Sub-system switches to a second VRG to continue servicing the I/O request.

These and other features and advantages of the present invention will become apparent after reading further description of the preferred embodiment(s) in conjunction with the accompanying Patent Drawings in the subject Patent Application.

BRIEF DESCRIPTION OF THE DRAWINGS

FIG. 5B shows and exemplary allocations of Physical Disk Extents in a Virtual Disk;

PREFERRED EMBODIMENT OF THE PRESENT INVENTION

Figure 1:
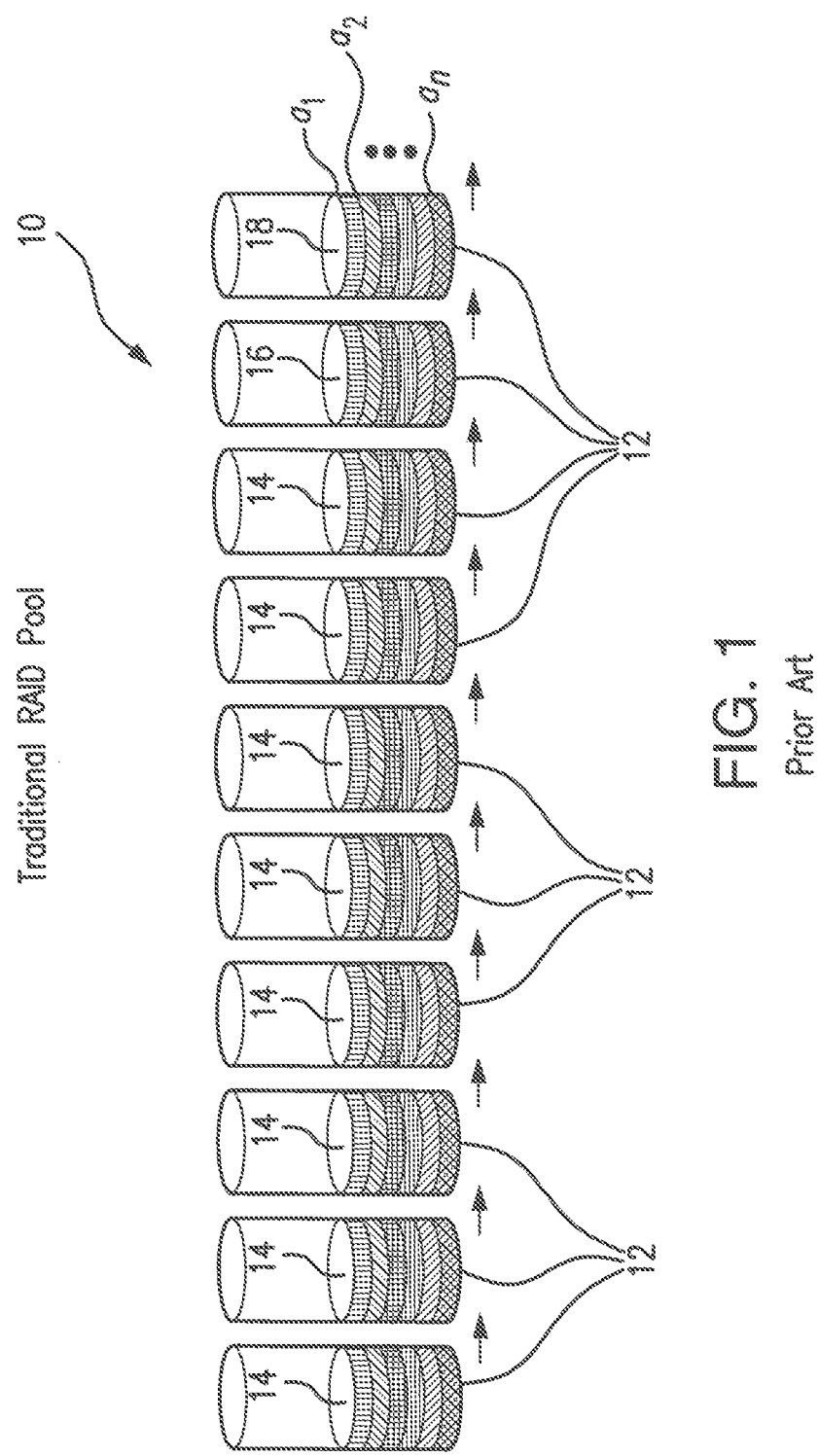
FIG. 1 is a schematic representation of represents a traditional RAID storage system.
Figure 2:
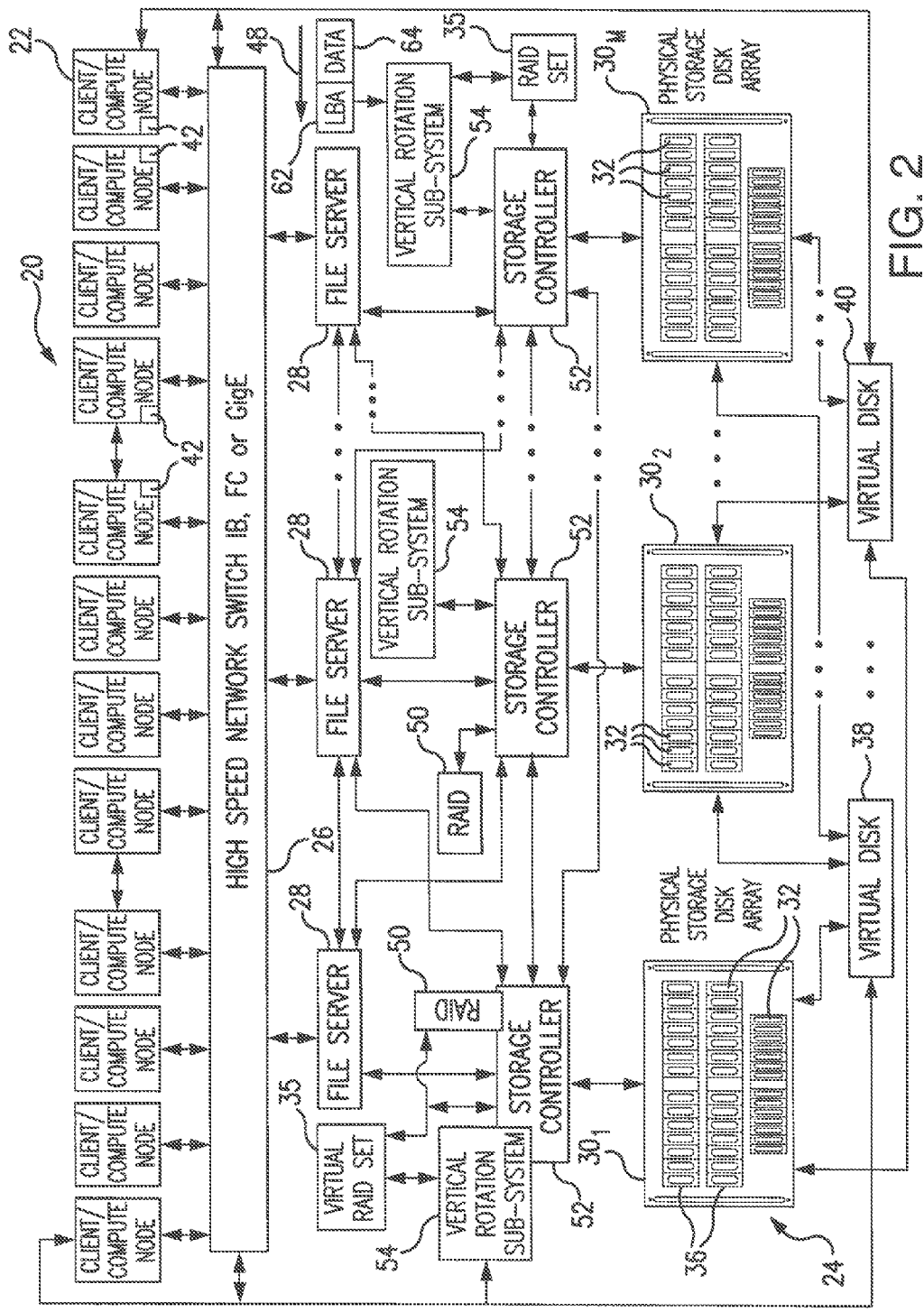
FIG. 2 is a block diagram of a simplified structure of the present system.

FIG. 2 depicts a simplified representation of the subject de-clustered RAID (DCR) system 20 supporting data migration between the Client Compute Nodes 22 and a Redundant Array of (Inexpensive) Independent Disks (RAID) storage sub-system 24. Shown in FIG. 2 is an exemplary system architecture, while numerous other implementations supporting data migration between data generating entities and RAID storage devices are contemplated in the scope of the present invention.

The compute nodes 22 may be arranged in computing groups, or computer clusters, to perform complex computations of various types. The operation of the compute nodes depends on the system application. They may function as servers, super computing clusters, etc., and have the capacity to "write" by outputting data, as well as "read" from the storage sub-system 24, or an external memory, as well as any other device. In the present description the above-presented devices will be intermittently referenced further herein also as data generating entities.

The compute nodes 22 are connected through a High-Speed Network 26 to File Servers 28 which manage data migration from and to the compute nodes 22. The ratio of the compute nodes 22 to the File Servers 28 may be in excess of a thousand in some applications. The File Servers 28 may satisfy requests of the compute nodes 22 in the same order as the requests are received at the File Server.

During the input/output (I/O) cycle of the compute nodes operation, the data may be transferred from the compute nodes' cache to the File Servers which may place data in the file system for subsequent retrieval. The High Speed Network 26 functions as a high speed switch and may be based on any of the network transport protocols, such as, for example, Infiniband (IB), Fibre Channel (FC), Gigabit Ethernet (GigE), etc.

System 20 is capable of handling any type of data transfer. Data retrieved from the compute nodes 22, and/or File Servers 28 (combinably referred to herein also as data generating entities) is intended to be stored on disk drives 32 which may be arrayed in any format, shown, for example, as storage disk arrays $30_1$, $30_2$, . . . , $30_M$. The storage disk arrays may be arranged, for example, in the RAID (Redundant Array of Independent Drives) format. Each RAID storage disk array $30_1$, $30_2$, . . . , $30_M$, is a multi-dimensional array of physical disk drives 32 distributed in Read/Write tier groups 36 for storing data D and parity values P (as well as Q) computed for the data stored in the array. Each tier group 36 in the array $30_1$, $30_2$, . . . , $30_M$ constitutes a multiplicity of data disk storage channels.

The Physical Disks 32 in each array $30_1$, $30_2$, . . . , $30_M$ may be of any type including traditional spinning disk drives, as well as solid state disks, such as flash memory, phase-change memory, memristors, as well as fiber channel physical disks, PDEs, SAS PDEs, or other non-volatile data storage carriers. For example (but not to limit the scope of protection of the present invention to the specific implementation), the PD 32 will be referred to as disk drives. However, any other memory storage media is contemplated in the scope of the present invention.

The present system supports the principles of the de-clustered RAID storage organization in which clients 22 use the de-clustered redundant disk arrays representations as abstract virtual disks, each providing a predetermined amount of storage space built with data storage units, called Physical Disk Extents (PDEs) of Physical Disks (PDs) included in the virtual disk.

Thus, in the present de-clustered RAID organization, each redundant disk array $30_1, 30_2, \ldots, 30_M$ includes a plurality of physical data storage disks 32, or disk drives (further referred to herein as Physical Disks, or PD), each of which, as depicted in FIGS. 3-4, and 5A-5B, is represented in a virtual domain as a collection of Physical Disk Extents (PDEs) 34.

Figure 3:
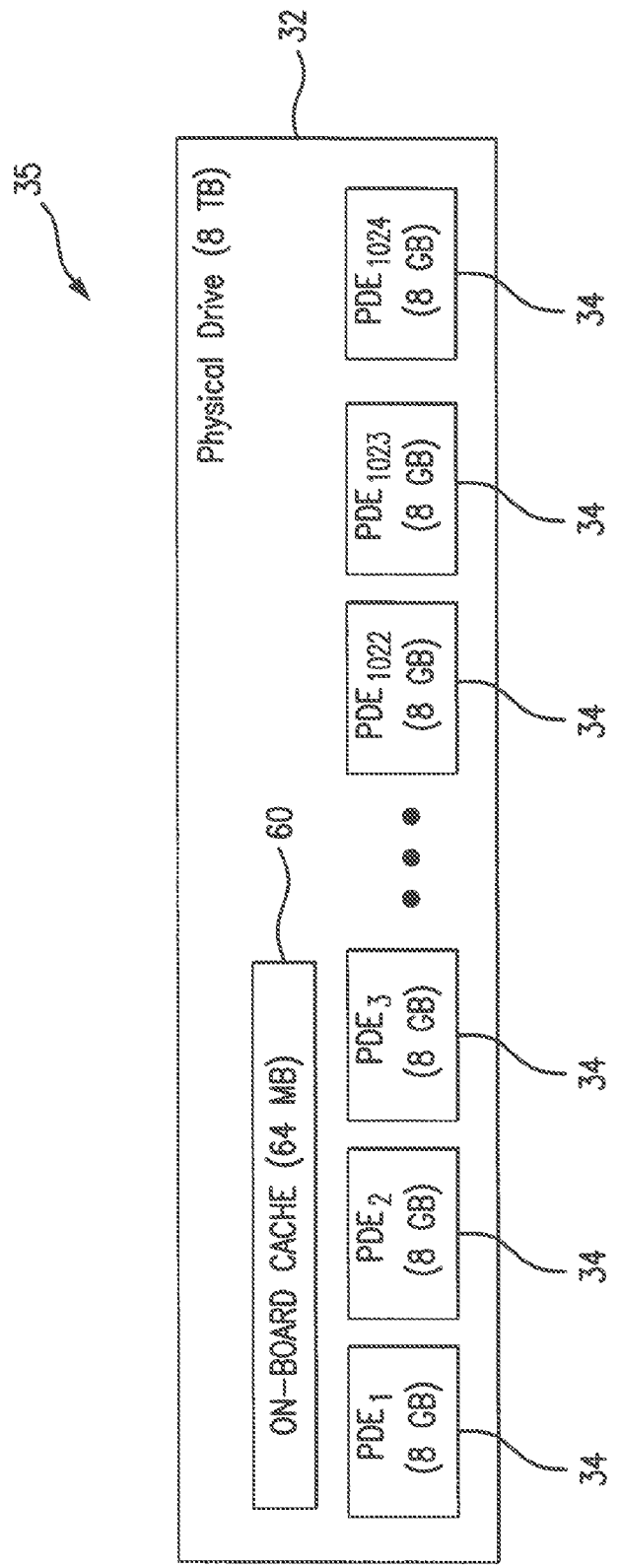
FIG. 3 is a schematic representation depicting the correspondence between a PD and PDEs.

Normally, a Physical Disk (PD) 32 has a certain memory size, for example, 1, 2, 4, or 8 terabytes, which is divided into logical pieces called Physical Disk Extents (PDE), for example 8 gigabytes in size. As depicted in FIG. 3, a PD 32 configured for saving 8 TB of data, may include, for example 1024 sections, or PDEs 34. The total number of PDEs 34 at different PDs 32 may differ one from another, but, preferably, their logical size is the same.

Figure 4:
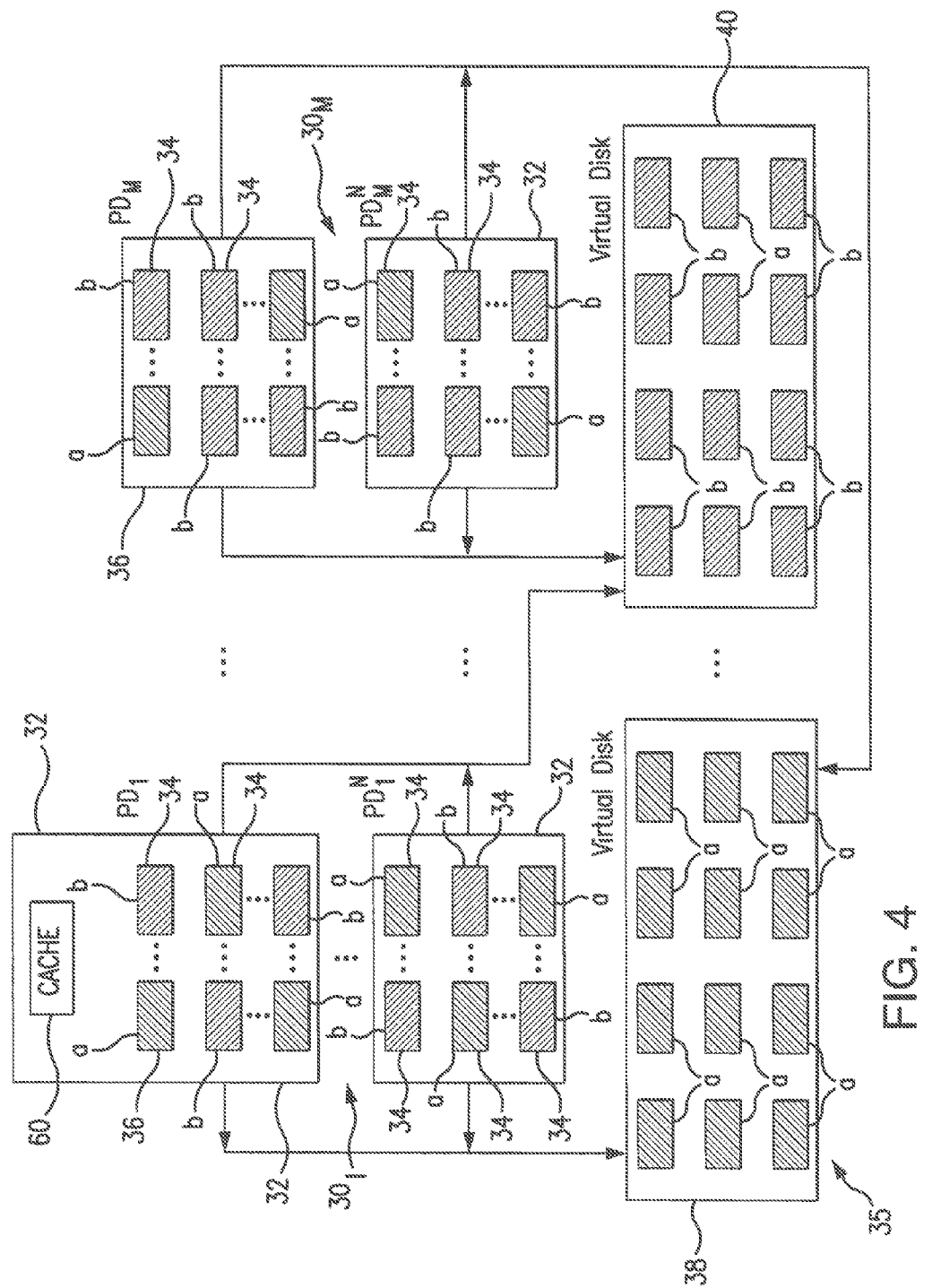
FIG. 4 is a schematic representation of a concept of virtual disks formulation with a plurality of Physical Disk Extents.

As depicted in FIG. 4, Physical Data Storage Disks $PD_1, \ldots, PD_1^N$ cumulatively form the physical storage disk array $30_1$, while physical disks data storage $PD_M, \ldots, PD_M^N$ form the storage disk array $30_M$.

One or more virtual disks, for example, virtual disks 38, ..., 40, in the virtual RAIDset 35, may be configured from PDEs 34 of the Physical Disks 32 presented in either of the storage disk arrays $30_1, 30_2, \ldots, 30_M$. For example, the PDEs "a" residing on the $PD_1, \ldots, PA_1^N$, and $PD_M, \ldots, PD_M^N$ are included in the virtual disk 38, while the PDEs "b" are included in the virtual disk 40. The subject De-clustered RAID (DCR) system may contain between 60 and 1000 physical drives 32 in its virtual RAIDset 35.

The PDEs 34 included in the same virtual disk (VD) may physically reside at any Physical Disk 32, and in any physical storage disk array $30_1, 30_2, \ldots, 30_M$. In some instances, the virtual disks 34, ..., 40 may partially overlap each with the other, i.e., contain at least one PDE included in at least two virtual disks out of VDs 38, ..., 40.

The inclusion of the PDEs in the specific virtual disks may be dynamically changed as required by the data migration process. Each of the virtual disks 38, ... 40 formed in the present system represent at least a portion of the plurality of Physical Disks 32 contained in any storage disk arrays $30_1, 30_2, \ldots, 30_M$.

The data generating entities 22 do not view the physical disks 32, and do not identify the PDEs 34 by their physical addresses associated with the corresponding Physical Disks. Quite to the contrary, in the present system, each data generating entity 22 "sees" the data storage sub-system 24 as a pool (or virtual RAIDset 35) of virtual disks 38, ..., 40 with each PDE 34 identified by its Logical Block Address (LBA).

Logical Block Address is a part of a linear addressing scheme where blocks are located by an integer index, with the first block, for example, being LBA0, the second block being LBA1, etc. As is known to those skilled in the art, in the Logical Block Addressing, typically only one number is used to address data, and each linear base address describes a single block. The LBA scheme replaces schemes which expose the physical details of the storage to the software of the operating system.

Figure 5A:
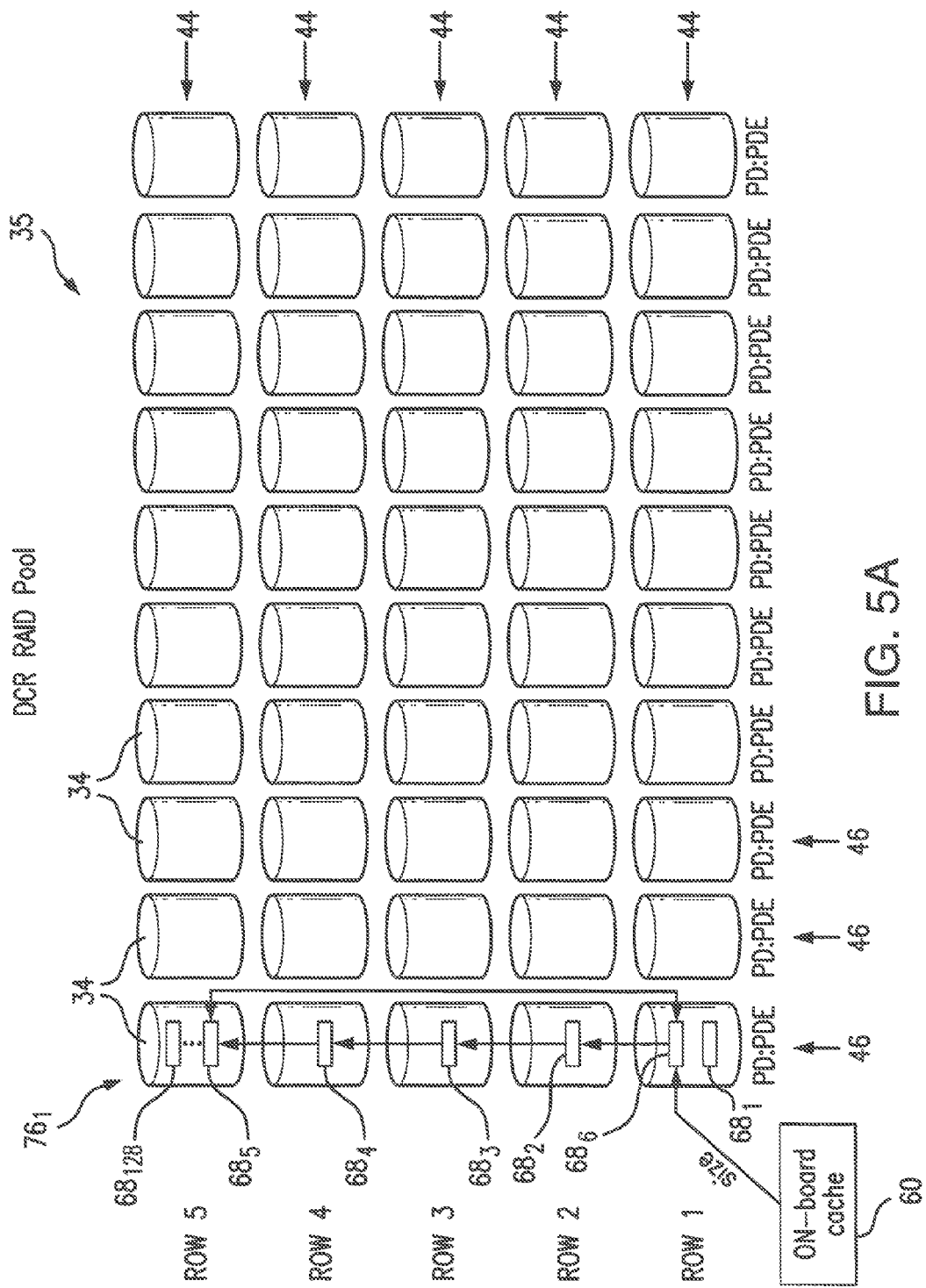
FIG. 5A is a schematic representation of the De-Clustered RAID (DCR) storage system supporting the principles of the subject Vertical Rotation.

As shown in FIGS. 5A-5B, in the RAIDset 35, each VD 38, ..., 40 is represented as a 2-dimensional structure with rows 44 and columns 46, each intersection of which identifies a unique PD:PDE pair showing an allocation of data chunks and parity data in the VD (RAIDset 35) in question.

In the exemplary representations of the virtual disks 38, 40, shown in FIG. 5B, each row 0, ..., 6 is shown with a corresponding parity stripe 70 distributed (de-clustered) on different PDEs. As shown, D1, D2, ... D8 columns represent data units 66, while P and Q columns represent parity units calculated by applying XOR function to the data units 66 in the parity stripe 70.

On the intersection of each column and the row in FIG. 5B, the pair PD:PDE represents a physical address of the PDE 34 where a data unit 66 or a parity unit P,Q is located in the overall virtual RAIDset 35. In each PD:PDE pair, the number before the column mark (:) represents a physical number of the Physical Disk 32, and the number after the column mark (:) represents a physical address of the PDE on the respective physical disk.

For example, on the intersection of the column D2 and the row 2 in the virtual disk 38, the number 165:0 means that the data unit D2 of the parity stripe 70 striped in the row 2 is stored at the Physical Disk number 165, in the PDE having an address "0" thereon.

Figure 7A:
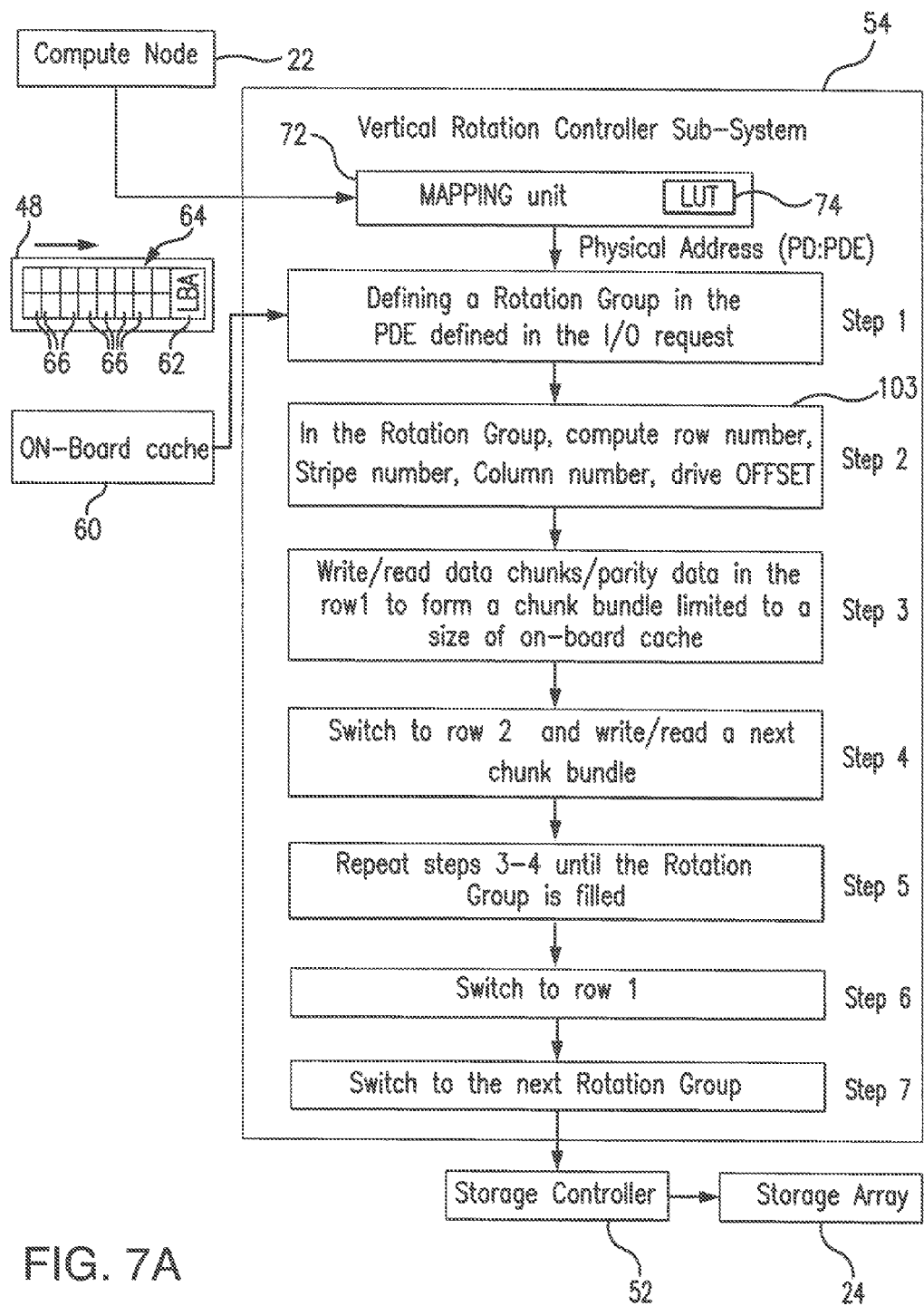
FIG. 7A is a schematic representation of the simplified operational principles of the Vertical Rotation Controller Sub-System in the subject system.

As shown in FIGS. 2 and 7A, when a specific data generating entity 22 issues an I/O request 48, which may be of different nature, for example, "write" or "read" request, the request 48 is sent through the High Speed Network switch 26 to a PDE 34 of interest whose LBA 62 is included in the request 48.

In the Virtual RAIDset 35, each PDE 34 has a specific LBA which the data generating entities indicate in their requests when I/O activity is desired.

A mapping unit 72 extracts the LBA from the request 48 received from the data generating entity 22, and computes a physical address of the PDE where data is to be written to or read from.

Each compute node 22 has a software unit 42 (shown in FIG. 2) which controls the operation of the respective compute node for the intended purposes and allocates I/O cycles during the execution of the compute node process.

During operation, a virtualized RAID unit 50 (shown in FIG. 2) applies RAID calculations to data ingress from a data generating entity 22 prior to "writing" the data in the PDE of interest. As a part of the RAID calculations, parity values P,Q are calculated for the ingress data 66 contained in the data field 64 of the request 48.

Space in the RAIDset 35 (particularly, specific PDEs) for the parity values is allocated for example by the RAID unit 50, or a storage controller 52, or the data generating entity 22. Data may be interleaved in stripe units distributed with parity information across a specific sequence of PD:PDEs, as for example shown in FIGS. 5A-5B. The parity scheme in the RAID computations may utilize either a two-dimensional XOR algorithm or a Reed-Solomon Code in a P+Q redundancy scheme, shown in FIG. 5B.

The RAID unit 50 may perform data reconstruction when "read" requests are serviced when corrupted or lost data is found. The parity values P and/or Q may be used to reconstruct the data during "read" operations.

A number of Storage Controllers 52 are included in the subject DCR system 20. As shown in the exemplary implementation depicted in FIG. 2, each storage controller 52 may be operatively coupled between the client compute nodes 22 and a respective storage disk array $30_1, 30_2, \ldots, 30_M$ for controlling data migration to and from the respective disk array.

The RAID unit 50, in an exemplary implementation shown in FIG. 2, may reside on or in operative coupling to a respective Storage Controller 52 and in operative connection to the data generating entities 22. However, alternative implementations supporting the RAID engine functionality in the present system are also contemplated. These may include, for example, a centralized RAID engine, etc.

A specific connection between each Storage Controller 52 and the corresponding storage disk array $30_1, 30_2, \ldots, 30_M$ shown in FIG. 2 is only one example of numerous other implementations of operative interconnection between the Storage Controller(s) 52 and the data storage sub-system 24 contemplated in the present data migration system 20. For example, all storage controllers may be configured to perform identical functions, and be interchangeable. Alternatively, one of the storage controllers may be appointed (for example, by a host) to perform parity calculations, while other storage controllers may be "tasked" to perform the role of the data storage controllers in accordance with the size and type of the "write" (or "read") data passing through the data channels, etc. Additionally, a specific function of the Storage Controllers, as well as their number in the system, and a collection of the Physical Drives and PDEs in the RAIDset 35 controlled by a specific Storage Controller may be adaptively defined, as needed, for servicing a specific "write" and/or "read" request.

Storage Controllers 52 control the operation of the disks 32 in the corresponding disk arrays $30_1, 30_2, \ldots, 30_M$. The present system 20 executes "write" and/or "read" requests in a highly efficient manner through utilizing a Vertical Rotation Controller Sub-system 54 which may be operatively coupled between the data generating entity 22 and a respective Storage Controller 52, or in some implementations, may reside on the Storage Controller. The specifics of the Vertical Rotation Sub-system 54 will be presented further herein in conjunction with FIGS. 2, 6, 7A-7B, and 8A-8C.

Referring to FIG. 7A, the Vertical Rotation Sub-System 54 includes a Mapping Unit 72 coupled operatively to a respective data generating entity 22 to extract therefrom the logic address, i.e., the LBA 62 identified in the request 48 for a PDE 34 of interest.

The I/O request 48 include an LBA code 62 identifying a desired PD and PDE for a data, and a data field 64 which include a number of data chunks 66 to be written at the desired PD and PDE in the I/O request 48. The parity data (P and/or Q) are calculated for the data chunks 66 in the data field 64 and are written at an address identified in the I/O request.

The Mapping Unit 72 is configured to compute a correspondence between the LBA 62 defined in the I/O request 48 and a physical address of the respective PDE 34 of interest, i.e., the physical address relative to a physical disk 32 where the PDE in question resides. Specifically, the Mapping Unit 72 associates each PDE 34 with its respective Physical Disk 32 based on the PDE's LBA. For example, the Mapping Unit 72 may use a Look-up-Table (LUT) 74 for the physical address computation.

In order to maximize the number of drives 32 used in a RAIDset 35, an attempt is made to evenly and randomly choose PDEs 34 from all the available drives 32. Each row of a DCR defined VD (Virtual Disk) 38, . . . , 40 includes a unique pair of PD:PDE. In this manner a DCR VD (which is a logical representation of the RAIDset 35) can leverage a high number of disk drives 32 for I/O operations rather than limiting it to a small number of drives.

For example, as shown in FIGS. 5A-5B, the exemplary RAIDset 35 may include 5 or more rows 44 with 10 columns 46, with each row of 8 GB×10 worth of data.

Even with the high number of available drives, when performing sequential "reads" and "writes" for the first to the last PD:PDE in the row, the data transfer rate is limited by the number of drives 32 in a particular set of PDE's that are in the current parity RAIDset stripe. With a PDE 34 of size 8 GB and a parity chunk size of 128 KB, the number of sequential accesses in a particular row 44 before switching to a next row is 65536, which is 128 times the capacity of a 64 MB on-board cache buffer. Thus, with a sequential "horizontal" data servicing through the entire row, the problem of overflowing the on-board cache is serious.

In the traditional RAID-6 redundancy scheme, chunks 66 of data are written to each member (PDE) of a parity stripe in sequence before rotating back to the first member of the stripe. Most drives have faster interfaces that are capable of transfer to the rotating media. In order to relieve the CPU from having to wait for each I/O to complete the drive manufacturers put a high speed cache buffer on the front of their drives to absorb incoming data. The problem is that the CPU can quickly fill up the buffer and still be put into the overflow mode.

In the subject DCR system, rather than sequentially writing or reading the data to fill/or exhaust the entire PDE before moving onto the next PDE in a row of the RAIDset 35, the Vertical Rotation Sub-system 54 cooperates with the RAID unit 50, RAIDset 35, and the Storage Controller 52 to read only a portion of the current PDE in an initial row (for example, Row 1) before moving "vertically" to a next PDE in the next row (for example, Row 2) of the RAIDset.

Figure 6:
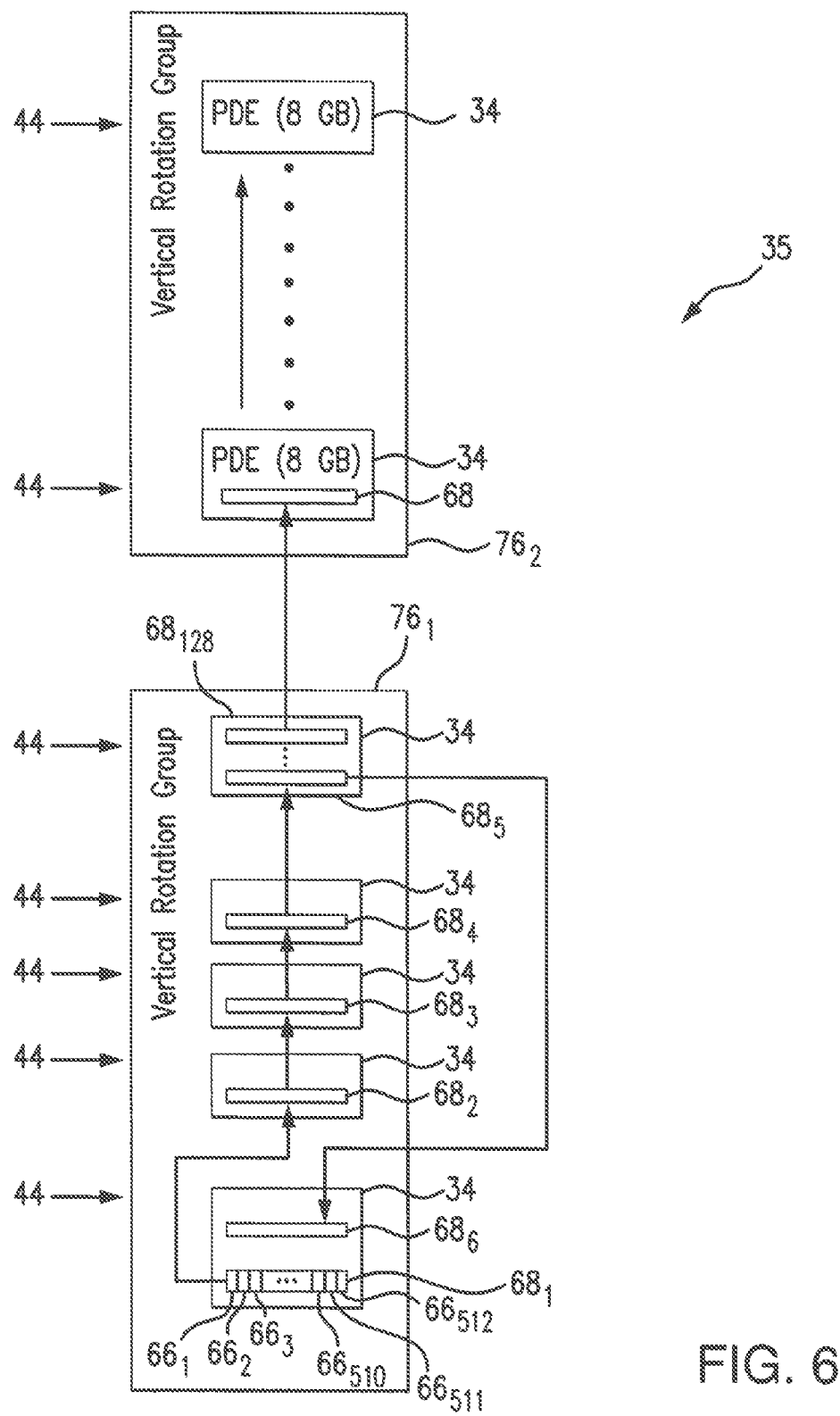
FIG. 6 is a schematic representation depicting the correspondence between a chunk bundle and a PDE.

As shown in FIGS. 5A and 6, this portion of the PDE 34, called a chunk bundle 68 ($68_1, 68_2, \ldots, 68_6$), is a multiple of the size of data chunks $66_1, 66_2, \ldots, 66_{510}, 66_{511}, 66_{512}$ for the RAID stripe 70 employed in the RAID (shown in FIG. 5B). Sizing of the chunk bundle 68 is performed by dividing the size of the drive on-board cache 60 by the size of the chunk 66. If for example, as shown in FIG. 6, the chunk size is 128 KB and the on-drive cache 60 is 64 MBs, then there would be 512 chunks $66_1, \ldots, 66_{512}$ in a chunk bundle $68_1, 68_2, \ldots, 68_6$.

As shown in FIGS. 5A and 6, the chunk bundle $68_1$ is first filled in a portion of the PDE residing in row 1. Upon reaching the size matching, the capacity of the on-board cache 60, i.e., for example, 64 MB (as opposed to the size 8 GB of the PDE 34), the servicing of the I/O request switches "vertically" to the PDE 34 residing in row 2, where another chunk bundle $68_2$ is filled. This process further vertically moves from row 2 to row 3 to form a chunk bundle $68_3$, then to row 4 to form the chunk bundle $68_4$, and to the row 5 for filling the chunk bundle $68_5$.

Upon filling the chunk bundle $68_5$, the command execution moves back to the PDE 34 residing in row 1 to form the chunk bundle $68_6$. Subsequently, the process can continue to form chunk bundles until the chunk bundle $68_{128}$ is formed in the PDE 34 on row 5. At this instance, a vertical rotation group $76_1$ is considered fully filled with chunk bundles, and the vertical rotation may further move to another vertical rotation group, for example, $76_2, 76_3, \ldots 76_n$.

Figure 7B:
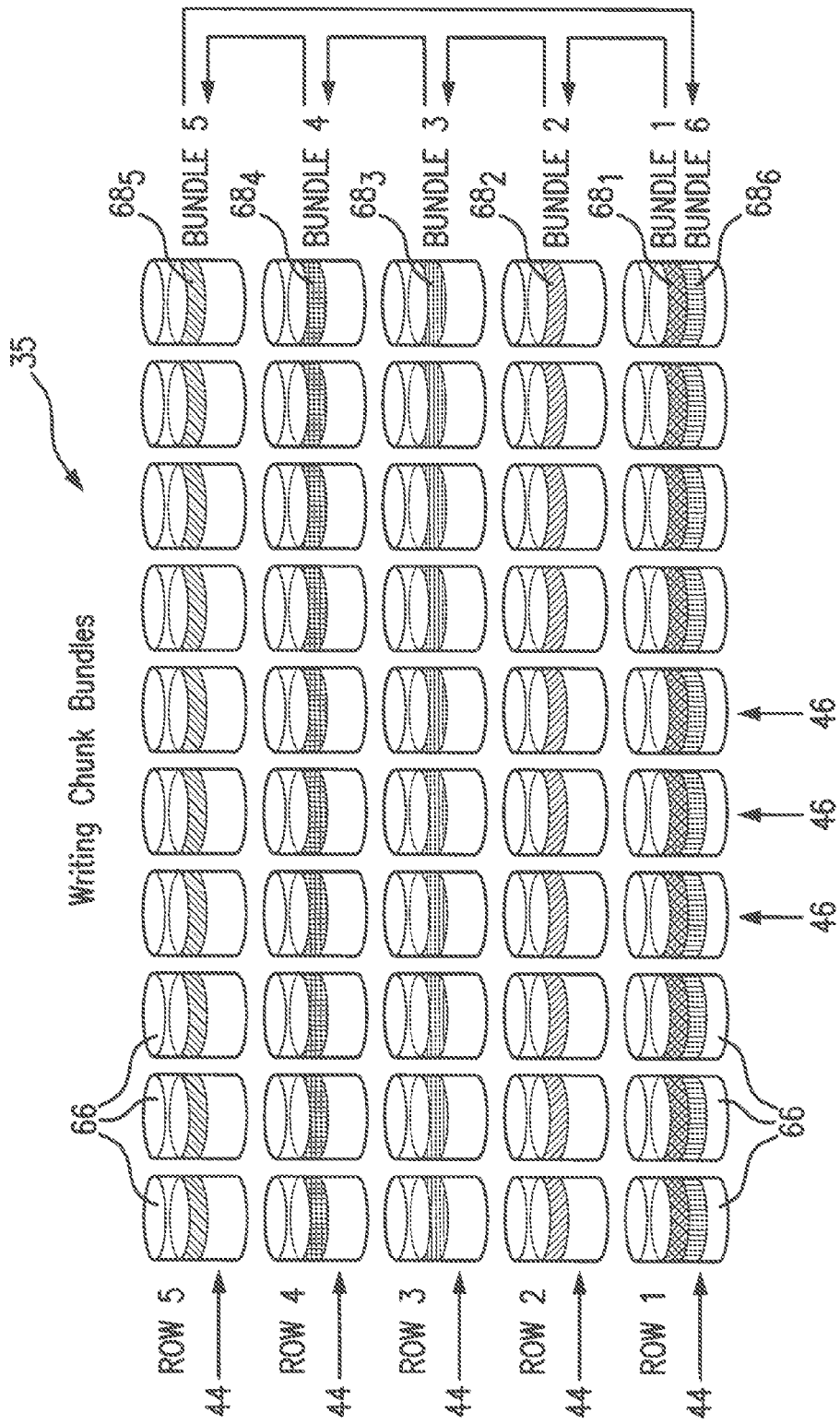
FIG. 7B is a schematic representation of the De-Clustered RAID system illustrating the subject concept of the Vertical writing of chunk bundles.

Referring to FIGS. 6 and 7B, each chunk bundle $68_1, 68_2, \ldots, 68_6$ is defined as a collection of chunks $66_1, \ldots, 66_{512}$. Each chunk bundle matches the size of the on-drive cache 60 (64 MB) on the PD corresponding to the PDE of interest.

Each 8 GB PDE may accommodate 128 chunk bundles 68. The row capacity of each Rotation Group 76 can match the size of the chunk bundle 68, i.e., the size of the on-board cache buffer 60. By limiting the writes to a size of the on-drive cache 60, overflow is prevented.

For random "reads" and "writes", the DCR leverages its many drive spindles and drive on-board caches 60 to maximize bandwidth.

In the present system, as shown in FIGS. 5A, 6, and 7A-7B, the concept of the subject Vertical Rotation is accomplished by performing a unique sequence of operations, where, in Step 1, upon receiving the Physical address of the PDE of interest, the Vertical Rotation Sub-System 54 computes a Rotation Group 76 ($76_1$) in correspondence with the size of the on-board cache buffer 60 on the PD where the PDE of interest resides.

Subsequently, in Step 2, the Vertical Rotation Sub-System 54 computes the row 44 (for example, row 1) to which access is to be provided for the parity stripe writing/reading, as well as the parity stripe No., column No., and the drive offset.

Following the Step 2, the data/parity are written/read to/from the row 1 to formulate a chunk bundle $68_1$, which does not exceed the size of the on-board cache 60. Once the chunk bundle $68_1$ is written/read, the system performs Step 4, where the execution of I/O operation is vertically switched to a row 2, and the chunk bundle $68_2$ is written/read.

Steps 3-4 are repeated by switching to row 3 (for formulating bundle $68_3$) to row 4 (for formulating bundle $68_4$), and to row 5 (for formulating a bundle $68_5$).

Thus, CPU vertically rotates execution of I/O operations from a previous row to the next row in the Vertical Rotation Group 76 (for example, $76_1$, as shown in FIGS. 5A and 6) until it is exhausted, and starts writing again, i.e., switches to the row 1 to formulate the chunk bundle $68_6$.

As a result, the CPU never has to wait for the I/O operations to complete due to a full buffer 60.

Once a chunk bundle 68 in one row is full, the code needs to switch to another row in order to avoid on-board buffer overflow. The question then arises how long will it take for the row to drain their buffers to the state where writing may be resumed to these drives. This depends on the ratio of the maximum sustained speed that the drive can transfer data to the rotating media and the speed of the I/O connection on the front of the drive. If a SAS 6 Gbs connection is used, then the front end speed is 600 MBs. Most modern drives can sustain about 80-150 MBs transfers to their back-end rotation media. For example, for a transfer rate of about 100 MBs, the Vertical Rotation Group 76 would include 6 DCR rows 44 each of size 6 rows (i.e., 600:100=6).

If writing starts to the first row up until the chunk bundle is filled, and then a switch is made to the next row in the Vertical Rotation Group 76, buffer overflows are avoided. After switching and filling the sixth row (the size of the Rotation Group), the procedure returns to the first row since the on-board buffers have been, by this time, drained and ready for a subsequent write operation.

After rotation within the Rotation Group $76_1$, when all the chunk bundles 68 have been filled (i.e., all 128 chunk bundles 68 are written in all PDEs in the rotation group $76_1$), the process switches to the next Vertical Rotation Group $76_2$ in Step 7. This process continues until all the Rotation Groups 76 are filled (FIG. 6). In this manner, a full write speed can be attained to empty cache buffers.

Each Vertical Rotation Group (VRG) 76 constitutes a subset of the DCR PDE column 46 in the RAIDset 35. As an example, a DCR column 46 might have 84 entries which may include 14 VRGs vertically arranged in the RAIDset 35 (as shown in FIG. 6), each with 6 entries in size such that they are stacked on top of each other in the table 74 (detailed in the following paragraphs).

Since the incoming I/Os are striped across the PDEs forming DCR rows 44, the Vertical Rotation Groups 76 co-exist as a set of columns 46. After a VRG $76_1$ is filled, i.e., all PDEs 34 thereof are filled with chunk bundles 68, the algorithm proceeds to the VRG above it in the column, i.e. the VRG $76_2$.

By writing or reading chunk bundles 68 for each PDE 34 before switching to a next PDE (PD:PDE), the server can maintain full connection speed for each column 46 of PDEs in the RAIDset. Each column 46 of PDEs in a DCR RAIDset 35 would then be running at full connection speed. Rather than being performance limited by the number of drives horizontally, the RAIDset speed limit in the subject system is the number of non-repeating vertical drives. The same drive cannot appear in the same column until its on-board cache has been flushed to the disk.

In the example presented in FIG. 7B, for an exemplary RAID-6 (8+2) redundancy scheme, the DCR RAIDset has 10 drives (PDEs) per row 44 (i.e., 10 columns 46). With each PDE 34 in the row 44 having a sustained transfer rate of approximately 120 MBs, a respective File Server 28 may expect to achieve a transfer rate of 1.2 GBs per row.

Assuming an inbound speed of the SAS connection is 600 MBs, by dividing the inbound speed by the drives maximum sustained transfer rate of 120 MBs, a rotation value of 5 is yielded. Thus, in order to prevent on-board cache overflow, a 600 MBs connection speed requires 50 non-repeating PDEs to achieve saturation, in the RAIDset housing 5 horizontal levels (rows) by 10 vertical levels (columns). With each row 44 having its own 600 MBs SAS channel, the transfer rate is multiplied by 1.2 GBs to achieve a new maximum of 6.12 GBs. If a more updated 12 GBs SAS interface is used, then the maximum sustained transfer rate 12.24 GBs is achieved with 100 non-repeating drives to prevent on-board cache overflow.

Figure 8A:
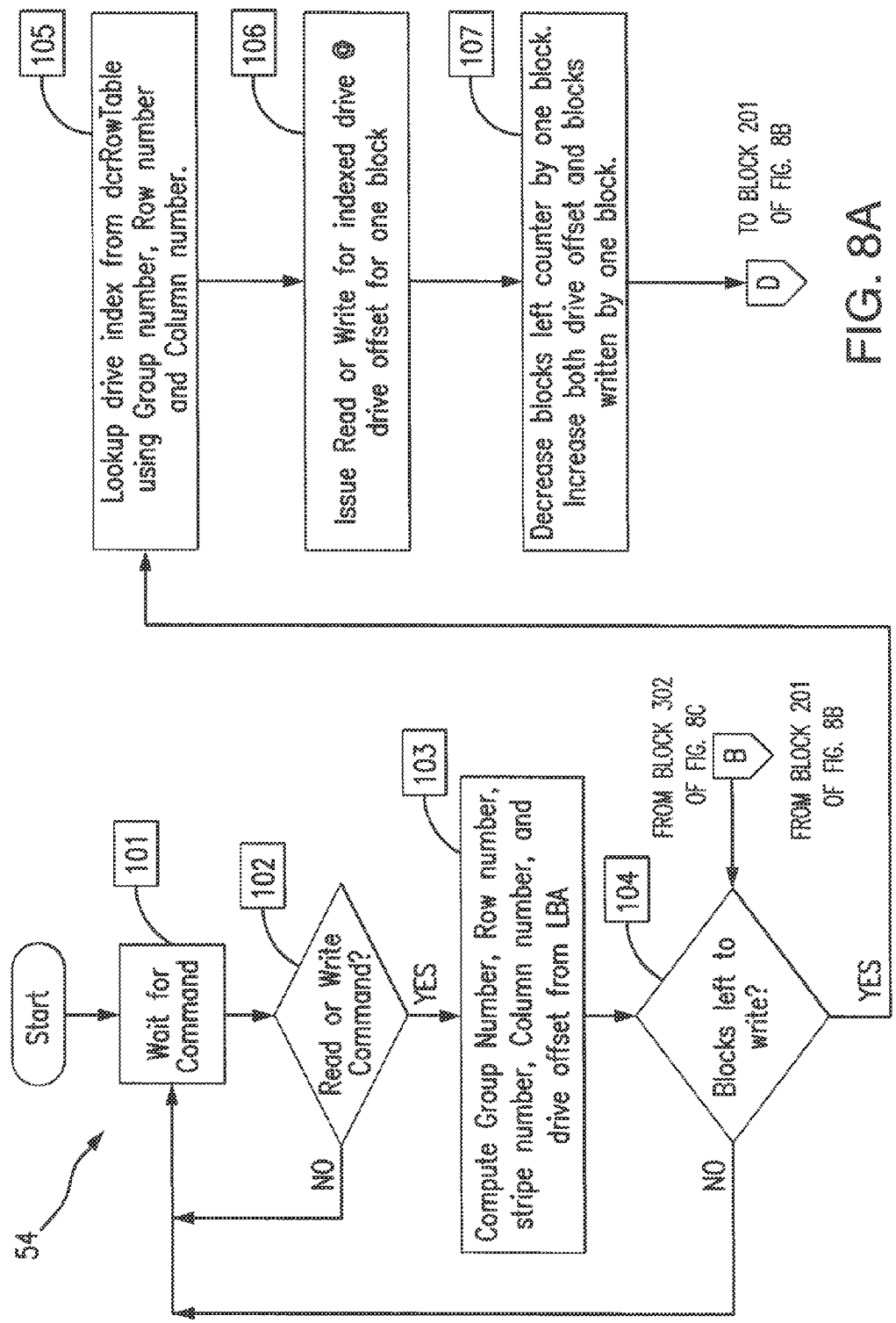
FIGS. 8A-8C are representative of the flow chart diagram of the vertical rotation process supported by the subject system.
Figure 8B:
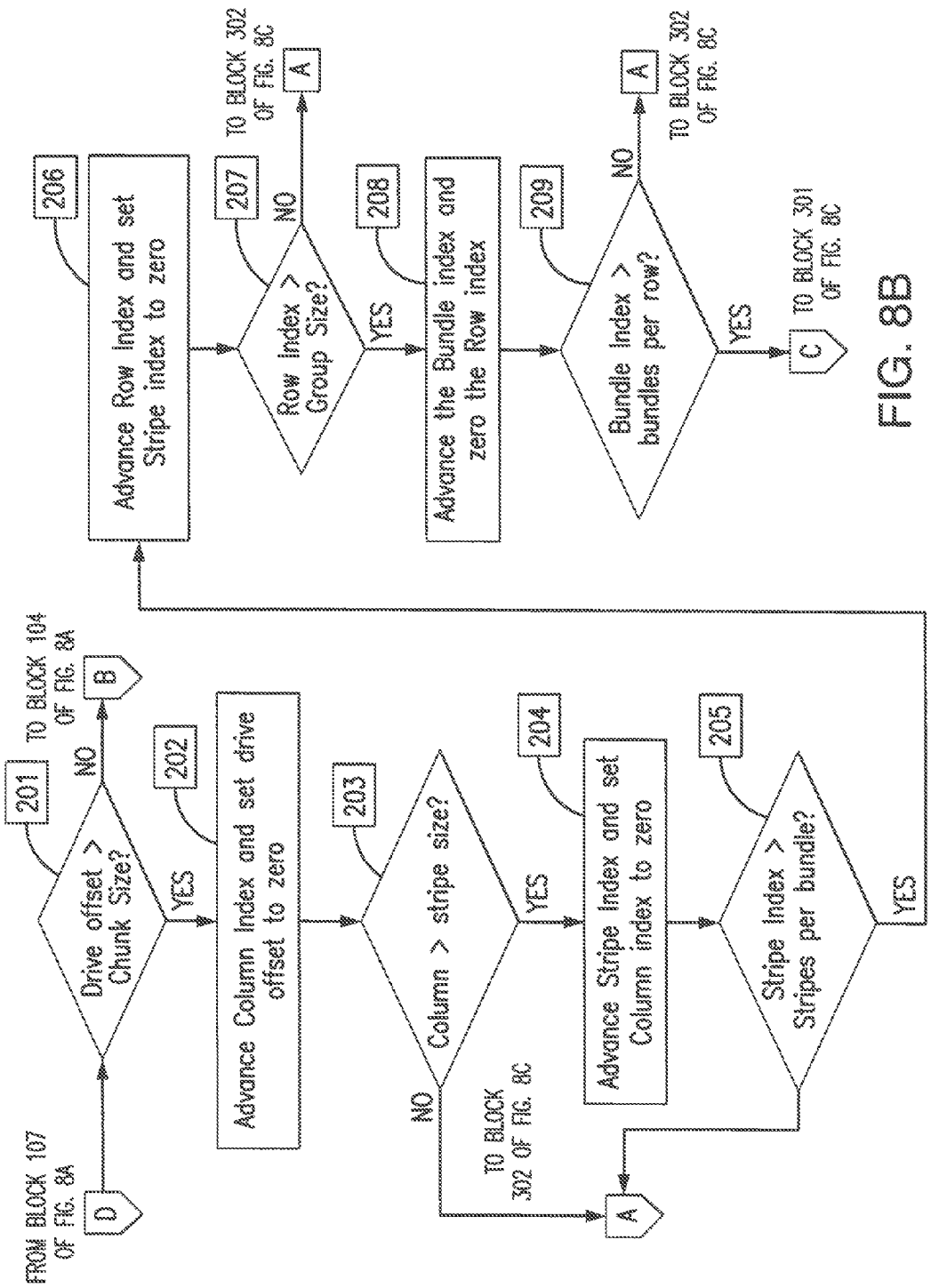
Figure 8C:
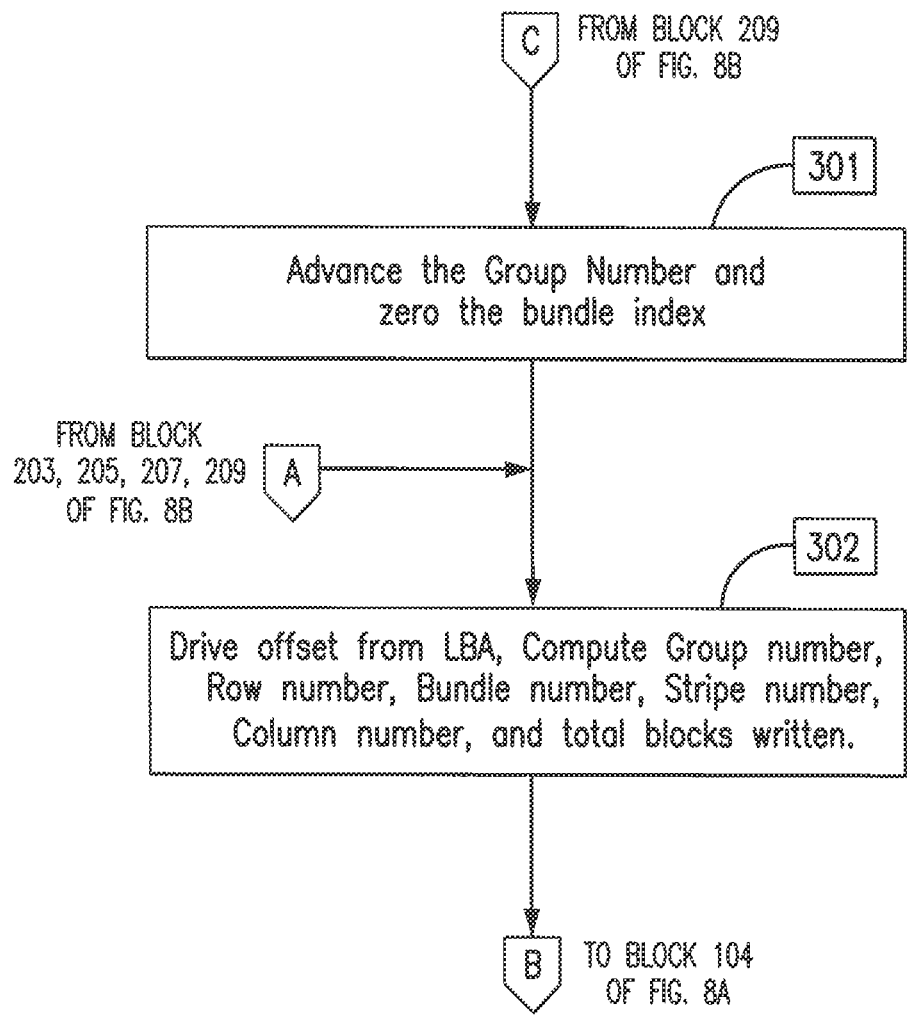

The operation of the subject Vertical Rotation Sub-system 54 is in part based on the flowchart presented in FIGS. 8A-8C, which reflects a simplified exemplary routine servicing one data block at a time during the Vertical Rotation procedure. A software implementation for the subject DCR also has the error handling routine as well as optimization for performing multiple block I/O processing routines whenever possible (not depicted in FIGS. 2-8C, but contemplated in the present system and method)

The implementation of the subject system has been written with a code written in C which is an algorithm which translates a VD's logical LBA into a physical address for a DCR defined VD.

Referring to FIG. 8A, as well as FIGS. 2 and 7A, the procedure running in the Vertical Rotation Sub-System 54 is initiated in the process Block 101 "Wait for Command". The I/O command ("write" request or "read" request) 48 is generated by a data generating entity 22 and is transmitted through the High-Speed Network Switch 26 and a File Server 28 to the Storage Controller 52, for being processed in the Vertical Rotation Sub-system 54 and the RAID Unit 50 prior to being written in the storage 24 by the Storage Controller 52.

The I/O request 48 includes the LBA code 62 for the desired PDE(s) and at least one, but in most cases, a number of data chunks 66 in the data field 64.

The RAID unit 50 proceeds by generating parity code(s) for the data chunks 66, and creates a parity stripe 70, which, as shown in FIG. 5B, includes the data chunks 66 and the parity data (P and/or Q), which are striped on a number of PDEs in one (or more) VDs 38, . . . , 40.

In Block 101 (in normal I/O processing), an execution thread waits for a command to come in for processing. When the thread is instantiated, a table known as the Drive Index Table which is used by the De-clustered RAID (DCR) for looking up the appropriate drive to use is assumed to have been initialized.

The drive Index Table may be for example a Look-up-Table 74 (shown in FIG. 7A), which shows the correspondence of the requested LBA to a PD:PDE of interest to be accessed. Once the I/O command 48 is received, the command execution proceeds to Block 102 "Read or Write Command?".

In process Block 102, a test is performed to identify whether the incoming command as either a 'write" request or a "read" request. Both of these commands will require re-mapping of their logical block address (LBA) by the algorithm.

Since logical volumes are presented to the hosts rather than physical ones, re-mapping LBAs is performed. Prior to DCR, there would be a fixed number of physical devices to translate. With the DCR, a table of drives for lookups for the PD:PDE pairing is provided.

If it is decided in Block 102 that the received command is not a command that requires LBA re-mapping, then control is returned to block 101. Otherwise the logic continues its execution in block 103 "Compute Group No, Row No., Stripe No., Drive Offset from LBA".

In process Block 103, several variables are calculated from the LBA identified in the received I/O request. Compute Group number refers to a Vertical Rotation Group 76 (shown in FIGS. 5A and 6) comprising several rows 44 of the DCR Drive Index Table.

As depicted in FIG. 7B (used as an example but not to limit the scope for this particular implementation), the exemplary Compute Group 76 may include 5 rows 44. Other implementations are also possible in the present system. The Row number is computed within the Compute Group 76.

The next variable to be computed is the Stripe number within the calculated row. The stripe number is the number of the portion of the full parity stripe write.

This computational routine is followed by computing the column 46 within the row 44. Finally a Drive Offset into the Drive Index Table is calculated, where the "read" or "write" command will operate on.

Assuming in an exemplary RAIDset that:
PDs (or PDEs) per row=8 (parity related PDs are not considered in this assumption);
Rotation group size=6 (i.e., 6 rows);
Chunk size in blocks=128 KiB/512=256 bytes;
Number of LBAs per stripe=Chunk size in blocks times PDs per row=2048;
Number of LBAs per row=(8 GiB/512) times PDs per row=134217728;
Number of LBAs per group=134217728 times Rotation group size=805306368.

From these assumptions, the variables are calculated in Block 103 as follows:
Rotation Group number=Incoming LBA divided by the number of LBAs per rotation group;
Row number=(Incoming LBA–(Group number times the number of LBAs per group)) divided by the number of LBAs per row;
Stripe Number=Incoming LBA–(Group number times the number of LBAs per group)–Row number times the number of LBAs per row) divided by the number of LBAs per stripe;
Column Number=Modulo of (Incoming LBA divided by the Chunk size in blocks) divided by the number of PDs per row;
Drive offset=Incoming LBA–(Group number times the number of LBAs per group)–(Row number times the number of LBAs per row)–(Stripe Number times the number of LBAs per stripe)–(Column Number times the Chunk size in blocks).

The drive offset is the actual location on the physical drive that the data is written to, which is the culmination of the LBA translation.

Upon computing the variables in Block 103, the procedure continues its execution in Block 104 "Blocks Left to Write".

In process Block 104, having enough information to execute the I/O command, a decision made as to whether there are any more blocks to write or read. If all the blocks (data chunks) have been processed, then the logic returns to Block 101 where it waits for another I/O command.

If there is at least one more block left to process, then the logic continues its execution in Block 105 "Look-Up-Drive Index from DCR Row Table using the Group No., Row No., and Column No.".

In process Block 105, having enough information, a table lookup is performed to yield an entry in DCR Drive Index Table. Each entry in the DCR Drive Index Table contains both a Physical Drive number and a Physical Drive Extent (PDE) index. For simplicity, the entry will be referred to as the indexed drive. From Block 105, the execution proceeds to Block 106 "Issue "Read" or "Write" for Indexed Drive and Drive Offset for one data block".

In process Block 106, an actual I/O command is performed with the indexed drive and the calculated drive offset for one block. Subsequently, the logic execution proceeds to block 107 "Decrease Blocks Left Counter by one block. Increase both Drive Offset and Blocks written by one block".

In process Block 107, having performed an I/O operation, the variable for the data blocks left is decreased by one, and both variables for the drive offset and the total bytes written are increased by one. Subsequently, the logic execution proceeds to Block 201 "Drive Offset>Chunk Size?".

As depicted in FIG. 8B (continued from FIG. 8A) in process Block 201, having advanced the drive offset by one, a test is performed to see if the new drive offset value has crossed a chunk size threshold.

For RAID systems, I/O data is segmented into sizes known as chunks 66. A chunk is the largest I/O that will be written to any one drive at a time. By crossing the chunk size threshold, RAID system needs to use the next drive in its sequence for any remaining I/O data. If the chunk size threshold is not crossed, then the procedure transfers control back to Block 104. Otherwise, the logic proceeds to Block 202 "Advance Column Index and set Drive Offset to Zero".

In process Block 202, having crossed the chunk size threshold, the column index is advanced by one, and the drive offset is reset to zero. Subsequently, the logic control is passed to Block 203 "Column>Stripe Size?"

In process Block 203, having advanced the column index, a test is made to determine whether the column index is still within the size of a stripe.

As shown in FIG. 5B, RAID stripes 70 are collections of RAID chunks 66. A full stripe write (FSW) consists of writing a chunk's worth of data to each column entry in a RAID stripe. If the column index is still within the stripe size, then control is passed to Block 302. Otherwise the logic control is passed to Block 204 "Advance Stripe Index and Set Column Index to Zero".

In process Block 204, the stripe index is advanced and the column index is set to zero. By setting the column index to zero, the logic uses a new entry in the drive index table on its next operation. Subsequently, the logic advances to Block 205 "Stripe Index>Stripes per Bundle?".

When the stripe index is advanced, a test is made in process Block 205 to determine whether the stripe index is still with the current bundle of chunk stripes. The size of a stripe bundle is determined by the size of the available on-disk cache buffers and the size of the RAID chunk used.

A chunk bundle is defined as a collection of chunks that match the size of the on-drive cache. By limiting the writes a CPU can write/read to/from the drive, to the size of the chunk bundle, thus preventing overflow. Shown in FIG. 7B, chunk bundles $68_1$, $68_2$, . . . , $68_6$, are dispersed in 10 columns 46 and 5 rows 44 of the Rotation Group 76.

If the stripe index has exceeded the bundle size, then the next I/O operation would exceed on-drive cache buffers. Exceeding the on-drive cache buffers would result in increased latency as the drive must complete outstanding I/Os before accepting anymore commands.

If the stripe index is still within the current bundle, then control is passed to Block 302 "Drive Offset from LBA, Compute Group No, Row No., Bundle No., Stripe No., Column No., and total blocks written", depicted in FIG. 8C.

If however the stripe index exceeds the bundle size, then logic control is passed to Block 206 "Advance Row Index and Set Strip Index to Zero".

In process Block 206, having exceeded the stripe bundle size, the stripe index is reset to zero and the row index increased by one. Since the on-drive caches are filled on this row advancing, the row index now defines the logic a new set of drives for use. For example, assuming that in Block 206, the chunk bundle $68_1$ in Row 1 has been processed, then the logic vertically advances to Row 2 to use the set of drives in columns 1-10 for the chunk bundle $68_2$, as depicted in FIG. 7B.

Subsequently, control is passed from Block 206 to block 207 "Row Index>Group Size?".

In process Block 207, a test is performed to determine whether the row index has exceeded the rotation group size. The size of a rotation group 76 is determined by the ratio of the maximum sustained transfer rate of the disk drives and the maximum transfer rate of the interface to the drives.

The interface of a disk drive can be from 5 to 10 times faster than the drives ability to record or read data from the physical media. If the row index has not exceeded the group size, then control passes to Block 302. If, however, the row index has exceeded the rotation group size, then control proceeds to Block 208 "Advance the Bundle Index and Zero the Row Index".

In process Block 208, having reached the top of the current rotation group 76 the row index is now reset to zero and the bundle index is advanced by one. Subsequently, control is passed to Block 209, "Bundle Index>Bundle per Row?"

With the bundle index having been increased, a test is performed in process Block 209 to determine if the index has exceeded the number of bundles in a row. The number of bundles in a row is determined by the size of PDE on the drive and the number of stripes in a bundle. If the bundle index has exceeded the number of bundles in a row, then the available space on the PDE has been exhausted and control is passed to Block 301 "Advance the Group No. and Zero the Bundle Index". Otherwise there is still space in the PDE and control is passed to Block 302.

In process Block 301, since all the space on the PDE has been used for all the rows in the rotation group, the Vertical Rotation Group (VRG) number is advanced by one (for example, from the VRG $76_1$, to VRG $76_2$, as shown in FIG. 6). Advancing the rotation group number effectively gives the logic another group of rows, bundles, and stripes to use for servicing I/O commands. Subsequently, the logic advanced to Block 302.

In process Block 302. Since the column, stripe, row, bundle, group index or blocks written/read have changed, a new drive offset is calculated and control is passed back to Block 104 to finish any outstanding operations.

The subject Vertical Rotation DCR accomplishes the striping without the need for multiple storage systems or external servers. In addition, the subject Vertical Rotation enhances the performance of a VD. In addition to maximizing Input/Output operation per second, (also reflected in the transfer rates (MBs) of throughput) increasing the number of drives involved results in a more efficient performance.

In the present DCR system, the RAID Unit 50 and a data migration management system, which includes the subject Vertical Rotation Sub-system 54, based for example on the SFA (Storage Fusion Architecture) manufactured by the Data Direct Network, Inc., may perform striping and management of the increased drive counts, thus reducing the complexity for external servers.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A method for data migration in a data storage system, comprising the steps of:
   (a) operatively coupling at least one data generating entity and a plurality of arrayed physical data storage devices, wherein each of said physical data storage devices includes an on-board cache buffer of a first predetermined size and a predetermined number of Physical Disk Extends (PDEs), each PDE constituting a data storage unit of a second predetermined size and having a physical address in relation to said each physical data storage device, wherein said second predetermined size exceeds said first predetermined size;
   (b) forming a de-clustered Redundant Array of Independent Disks (RAID) structure containing a plurality of PDEs arranged in a first number of horizontally arranged rows and a second number of vertically arranged columns;
   (c) issuing, by said at least one data generating entity, at least one respective I/O request for data migration between said at least one data generating entity and respective data storage devices, wherein said at least one respective I/O request includes data units and Logical Block Addresses (LBAs) of PDEs of interest;
   (d) computing at least one parity unit associated with said data units, and forming a parity stripe composed of said data units and said at least one parity unit;
   (e) in said de-clustered RAID (DCR) structure, formulating a collection of PDEs of interest in accordance with said LBAs identified in said I/O request;

(f) striping said parity stripe throughout at least a portion of said PDEs in said collection thereof through a Vertical Rotation routine performed through the steps of:

(g) computing, in said de-clustered RAID (DCR) structure, at least one Vertical Rotation Group (VRG) arranged with a predetermined number of rows from said first number of rows included in said DCR structure, (h) limiting an I/O operation relative each PDE in said collection thereof to said first predetermined size of said on-board cache buffer, (i) writing a respective stripe portion of said parity stripe into a respective PDE residing at one of said rows of said at least one Vertical Rotation Group, thus forming a first data chunk bundle of a size not exceeding the first predetermined size of said on-board cache buffer, and (j) switching to a next PDE residing at a next row vertically displaced from said row one along a respective column from said second number thereof in said at least one Vertical Rotation Group, and filling a second data chunk bundle in said next PDE residing at said next row with another portion of said parity stripe, wherein the size of said second data chunk bundle does not exceed the first predetermined size of said on-board cache buffer.

2. The method of claim 1, further comprising, subsequently to said step (j), the step of:

(k) repeating said steps (i) and (j) until each PDE residing at said predetermined number of rows in said at least one Vertical Rotation Group is written with at least one data chunk bundle having a size not exceeding the first predetermined size of said on-board cache buffer.

3. The method of claim 2, further comprising the step of:
subsequent to said step (k), switching to said respective PDE residing at said row one, and writing a subsequent data chunk bundle in said respective PDE.

4. The method of claim 1, further comprising the steps of:
in said step (g), computing at least a first and second said Vertical Rotation Groups, each constituting a respective subset of said respective column in said second number of columns in said DCR structure and including a respective subset of said predetermined number of said rows of said DCR structure, and
switching from said at least first Vertical Rotation Group to said at least second Vertical Rotation Group when said at least first Vertically Rotation Group is filled with said data chunk bundles.

5. The method of claim 4, further comprising the step of:
arranging said Vertical Rotation Groups vertically respective one to another in said DCR structure along said respective column.

6. The method of claim 2, further comprising the steps of:
in said step (k), vertically rotating said I/O operations from one row to another until each of said PDEs in said at least one Vertical Rotation Group is filled with a predetermined number of respective data chunk bundles, thus filling said at least one Vertical Rotation Group.

7. The method of claim 1, further comprising the steps of:
prior to said step (d), operatively coupling at least one Vertical Rotation Controller Sub-System to said de-clustered RAID (DCR) structure and to said at least data generating entity,
configuring said at least one Vertical Rotation Controller Sub-System with a Drive Index Look-Up-Table (LUT), initializing said Drive Index LUT upon receipt of said I/O request, and
establishing physical addresses of said PDEs of interest based on said LBAs using said Drive Index LUT.

8. The method of claim 7, further comprising the steps of:
defining a plurality of variables including:
a number of Physical Disks (PDs) per a row of said DCR structure,
a size of said at least one Vertical Rotation group corresponding to a number of said data chunk bundles to be written therein,
a size of the said data units,
a number of said LBAs per said parity stripe defined as said size of data unit times said number of PDs per row,
a number of said LBAs per said row defined as said PDE size divided by a number of data units in said row, and
a number of said LBAs per said at least one Vertical Rotation Group defined as said number of LBAs per row times said size of said at least one Vertical Rotation Group.

9. The method of claim 8, further including the steps of:
in said step (g), performing computational routines, including:

(l) computing said at least one Vertical Rotation Group number by dividing said LBAs identified in said I/O request by the number of LBAs per said at least one Vertical Rotation Group;

(m) computing said row number as (said LBA identified in said I/O request—(Vertical Rotation Group Number times the number of LBAs per said at least one Vertical Rotation Group) divided by the number of LBAs per row);

(n) computing a stripe number as (said LBA identified in said I/O request—(Vertical Rotation Group number times the number of said LBAs per group)–(the Row number times the number of LBAs per row) divided by the number of LBAs per stripe);

(o) computing a column number as Modulo of (said LBA identified in said I/O request divided by the size of said data units) divided by the number of PDs per said row; and (p) computing a Drive Offset as (said LBA identified in said I/O request—Vertical Rotation Group number times the number of LBAs per said at least one Vertical Rotation Group)–(said Row number times the number of the LBAs per row)–(stripe number times the number of LBAs per parity stripe)–(DCR column number times the size of data unit).

10. The method of claim 9, further comprising the steps of:
subsequent to said step (g), deciding whether all data units in said I/O request have been processed, and (q) if at least one data unit has not been processed, searching in said Drive Index LUT for the index of said PDE of interest corresponding to said row number, said column number, and said at least one Vertical Rotation Group number,
executing said I/O request for said at least one data unit not being processed using said PDE of interest index and said computed drive OFFSET,
subsequently, decreasing a Block Left variable by one,
increasing said drive OFFSET variable, thus formulating a new drive OFFSET, and
increasing a Total Bytes Written variable by one.

11. The method of claim 10, further comprising the steps of:

in said step (q), subsequently to increasing said drive OFFSET variable by one,
deciding if said new drive OFFSET value has crossed a data unit size threshold,
advancing said parity stripe number by one, if said data unit size threshold is crossed, and
setting said column index to zero, thus transferring to a new drive and PDE number in said Drive Index LUT.

12. The method of claim 11, further comprising the steps of:
subsequently to advancing said parity stripe by one,
testing if said advanced parity stripe portion number falls within said at least one data chunk bundle, and
if said advanced parity stripe portion number exceeds said at least one data chunk bundle size,
resetting said advanced parity stripe portion number to zero, and
increasing said row number by one, thus switching the I/O execution vertically from one row to another.

13. The method of claim 12, further comprising the steps of:
subsequently to switching vertically from one row to another,
testing if said row number has exceeded said at least Vertical Rotation Group size, and
if exceeded, re-setting said row number to zero, and advancing said data chunk bundle number by one.

14. The method of claim 13, further comprising the steps of:
subsequently to increasing said data chunk bundles number by one,
testing if said increased number of said data chunk bundle exceeds a number of the chunk bundles in the row, said row being determined by a size of said PDE and a number of data units in said data chunk bundle, and
if said number of data chunk bundles exceeds the number of the data chunk bundles in the row, advancing the Vertical Rotation Group number by one, and
switching to a next Vertical Rotation Group for said I/O request execution.

15. The method of claim 14, further comprising the step of:
switching from one said Vertical Rotation Group to said next Vertical Rotation Group until said I/O request is completed.

16. The method of claim 15, further comprising the steps of:
in said step (b), forming at least one Virtual Disk structure from said collection of respective PDEs residing on at least a portion of said plurality of physical data storage devices,
operatively coupling said at least one data generating entity to said at least one Virtual Disk,
identifying each respective PDE included in said at least one Virtual Disk structure by a respective LBA relative to said at least one Virtual Disk structure,
in said step (d), applying RAID computation to said at least one data units identified in said I/O request, and
in said step (f), writing said parity stripe in said at least one Virtual Disk in de-clustered fashion on PDEs included in at least a portion of said collection of PDEs.

17. A data storage system with improved I/O operation, comprising:
at least one data generating entity operatively coupled to a plurality of arrayed physical data storage devices, wherein each of said physical data storage devices includes an on-board cache buffer of a first predetermined size, and a respective number of Physical Disk Extends (PDEs), each constituting a data storage unit having a second predetermined size and a physical address in relation to said each physical data storage device, wherein said second predetermined size exceeds said first predetermined size, and
wherein said at least one data generating entity is configured to issue at least one respective I/O request for data migration between said at least one data generating entity and respective data storage devices, wherein said at least one respective I/O request includes a number of data units and Logical Block Addresses (LBAs) for respective PDEs of interest;
a de-clustered Redundant Array of Independent Disks (RAID) structure formed with at least a portion of said plurality of physical data storage devices, respective PDEs of said at least a portion of said physical data storage devices in said declustered RAID structure being arranged in a first number of rows and a second number of columns;
a RAID unit configured for computing at least one parity unit associated with said number of data units, forming a parity stripe composed of said number of data units and said at least one parity unit, and striping said parity stripe in said de-clustered RAID (DCR) structure across a respective subset of said respective PDEs of interest; and
a Vertical Rotation Controller Sub-System operatively coupled to said RAID unit, said at least one data generating entity, and said DCR structure,
said Vertical Rotation Controller Sub-System including:
at least first and second Vertical Rotation Groups (VRGs), each VRG containing a predetermined number of rows of said respective PDEs, said predetermined number of the rows of said respective PDEs in each VRG being associated with a respective subset of a respective column from said second number thereof in said DCR structure;
wherein said Vertical Rotation Controller Sub-System is configured to write respective limited to said first predetermined size portions of said parity stripes into the respective PDEs included in said first Vertical Rotation Group, thus forming data chunk bundles in each said respective PDE, and
to switch from a first PDE residing in a first row to a second PDE residing in a second row once the data chink bundle in the first PDE has been filled.

18. The system of claim 17, wherein said Vertical Rotation Controller Sub-System is further configured to fill each of PDEs vertically arranged in said DCE structure along said respective column with said data chunk bundles, until said at least first VRG is filled with said data chunk bundles.

19. The system of claim 18, wherein said Vertical Rotation Controller Sub-System is further configured to switch vertically from said at least first VRG to said at least second VRG to continue servicing said I/O request.

20. The system of claim 19, wherein said Vertical Rotation Controller Sub-System further includes:
a Mapping unit receiving said I/O request, and a Drive Index Look-Up-Table (LUT) within said Mapping unit,
wherein said Drive Index LUT is configured to establish physical addresses of said respective PDEs of interest based on said LBAs, and wherein said collection of respective PDEs in said DCR structure is built using said physical addresses of respective PDEs of interest.

* * * * *